US012745253B2

(12) United States Patent
Gao et al.

(10) Patent No.: US 12,745,253 B2
(45) Date of Patent: Sep. 22, 2026

(54) PHYSICAL DOWNLINK CONTROL CHANNEL MONITORING METHOD AND APPARATUS

(71) Applicant: HUAWEI TECHNOLOGIES CO., LTD., Shenzhen (CN)

(72) Inventors: Fei Gao, Shanghai (CN); Shurong Jiao, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 549 days.

(21) Appl. No.: 17/961,403

(22) Filed: Oct. 6, 2022

(65) Prior Publication Data

US 2023/0047144 A1 Feb. 16, 2023

Related U.S. Application Data

(63) Continuation of application No. PCT/CN2021/081942, filed on Mar. 20, 2021.

(30) Foreign Application Priority Data

Apr. 10, 2020 (CN) ......................... 202010280741.5

(51) Int. Cl.
*H04W 72/23* (2023.01)
*H04W 24/08* (2009.01)
(Continued)

(52) U.S. Cl.
CPC ........... *H04W 72/23* (2023.01); *H04W 24/08* (2013.01); *H04W 72/0446* (2013.01); *H04W 72/53* (2023.01)

(58) Field of Classification Search
CPC ............. H04W 72/23; H04W 72/0446; H04W 72/0453; H04L 5/0007; H04L 5/0035; H04L 5/0053
See application file for complete search history.

(56) References Cited

U.S. PATENT DOCUMENTS

2021/0037607 A1* 2/2021 Hamidi-Sepehr ..... H04W 24/08
2021/0153177 A1* 5/2021 Hosseini .............. H04W 72/23
(Continued)

FOREIGN PATENT DOCUMENTS

CA 3000508 A1 * 4/2017 ............. H04L 5/001
EP 3451553 A2 3/2019
(Continued)

OTHER PUBLICATIONS

Huawei, "Summary of email discussion [100e-NR-L1enh_URLLC_PDCCH-03] on remaining issues on enhanced PDCCH monitoring capability," 3GPP TSG RAN WG1 Meeting #100-e, R1-2001409, Total 43 pages, 3rd Generation Partnership Project, Valbonne, France (Feb. 24-Mar. 6, 2020).
(Continued)

*Primary Examiner* — Jutai Kao
(74) *Attorney, Agent, or Firm* — Leydig, Voit & Mayer, Ltd.

(57) ABSTRACT

This application provides a physical downlink control channel monitoring method and an apparatus. The method includes: determining that a first monitoring capability of a terminal device is used to monitor a physical downlink control channels of a cell set of the terminal device, determining N non-overlapping time units of the cell set in one slot, where a start location of each of the N time units is based on a span of a cell in the cell set, and allocating the first monitoring capability in the cell set based on the N time units to separately monitor a physical downlink control channel of each cell in the cell set, so that in a carrier aggregation (CA) scenario, the terminal can monitor a physical downlink control channel at a granularity of a span.

15 Claims, 10 Drawing Sheets

(51) Int. Cl.
*H04W 72/0446* (2023.01)
*H04W 72/53* (2023.01)

(56) References Cited

U.S. PATENT DOCUMENTS

| | | | | |
|---|---|---|---|---|
| 2021/0227569 | A1* | 7/2021 | Xu | H04L 5/0053 |
| 2022/0201515 | A1* | 6/2022 | Chatterjee | H04L 5/0091 |
| 2023/0006803 | A1* | 1/2023 | Shi | H04L 5/0092 |

FOREIGN PATENT DOCUMENTS

| | | | |
|---|---|---|---|
| WO | 2020072963 | A1 | 4/2020 |
| WO | WO-2020066854 | A1 * | 4/2020 |

OTHER PUBLICATIONS

Ad-Doc Chair (NTT DOCOMO, Inc.), "Chairman's notes of AI 7.1.7," 3GPP TSG RAN WG1 #96bis, Xi'an, China, R1-1905800, Total 6 pages, 3rd Generation Partnership Project, Valbonne, France (Apr. 8-12, 2019).

Huawei, "Summary #4 of 7.2.6.1 PDCCH enhancements," 3GPP RAN WG1, Meeting #99, Reno, USA, Mobile Competence Centre, 650, Route Des Lucioles, F-06921, Sophia-Antipolis Cedex France, R1-1913541, Total 62 pages, 3rd Generation Partnership Project, Valbonee, France (Nov. 2019).

"3rd Generation Partnership Project; Technical Specification Group Radio Access Network; NR; Physical layer procedures for control (Release 16)," 3GPP TS 38.213, V16.0.0, Mobilecompetence Centre, 650, Route Des Lucioles, F-06921 Sophia-Antipolis Cedex, France, Total 146 pages, 3rd Generation Partnership Project, Valbonne, France (Dec. 2019).

* cited by examiner

S601: Determine that a first monitoring capability of a terminal device is used to monitor a PDCCH of a cell set of the terminal device S602: Determine N time units of the cell set in one slot S603: Allocate the first monitoring capability in the cell set based on the N time units, to separately monitor a PDCCH of each cell in the cell set PCell (4, 3) 0 1 2 3 4 5 6 7 8 9 10 11 12 13

Span #1 Span #2 Span #3

SCell (4, 3) 0 1 2 3 4 5 6 7 8 9 10 11 12 13

Span #4 Span #5 Span #6

| PCell (4, 3) | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| | | | Span #1 | | | | Span #2 | | | | Span #3 | | | |
| SCell (4, 3) | 0 | 1 | 2 | 3 | 4 | 5 | 6 | 7 | 8 | 9 | 10 | 11 | 12 | 13 |
| | | | Span #4 | | | | Span #5 | | | | Span #5 | | | |

FIG. 11

PHYSICAL DOWNLINK CONTROL CHANNEL MONITORING METHOD AND APPARATUS

CROSS-REFERENCE TO RELATED APPLICATIONS

This application is a continuation of International Patent Application No. PCT/CN2021/081942, filed on Mar. 20, 2021, which claims priority to Chinese Patent Application No. 202010280741.5, filed on Apr. 10, 2020. The disclosures of the aforementioned applications are hereby incorporated by reference in their entireties.

TECHNICAL FIELD

This application relates to the field of communication technologies, and in particular, to a physical downlink control channel monitoring method and an apparatus.

BACKGROUND

In a 5th generation (5G) mobile communication system, a network device may send data to a terminal device or receive data from a terminal device through a data channel. To enable the terminal device to perform data transmission with the network device through the data channel, the network device and the terminal device need to agree on some transmission parameters for transmitting data on the data channel. For example, for downlink data transmission, the data channel may be a physical downlink shared channel (PDSCH), and control parameters for controlling the data transmission on the PDSCH are transmitted through a physical downlink control channel (PDCCH). For uplink data transmission, the data channel may be a physical uplink shared channel (PUSCH), and control parameters for controlling the data transmission on the PUSCH are transmitted from the network device to the terminal device through the PDCCH.

Because the terminal device does not know in advance whether the network device sends the PDCCH, the terminal device needs to monitor the PDCCH at locations at which the PDCCH may be sent. These monitoring locations may also be referred to as PDCCH monitoring occasions (MO). Such monitoring and detection performed by the terminal device on the PDCCH is also referred to as blind detection.

Support for ultra-reliable and low latency communication (URLLC) services is introduced in the 5G system. To meet a low latency requirement of these services, a smaller scheduling time unit is introduced in 5G. For example, the network device may schedule the terminal device at some symbol locations in a slot, instead of scheduling the terminal device only at a start symbol of the slot. In addition, duration of the PDSCH or the PUSCH may alternatively be only several symbols. Therefore, a concept of a PDCCH monitoring time span (monitoring span) is introduced in 5G. The terminal device monitors the PDCCH at a granularity of the PDCCH monitoring span, and monitors the PDCCH within the PDCCH monitoring span. It may be understood that one PDCCH MO is included in one PDCCH monitoring span.

In a carrier aggregation (CA) scenario, if a PDCCH or a candidate PDCCH (PDCCH candidate) is monitored at a granularity of the PDCCH monitoring span, because a configuration of a PDCCH monitoring span of each cell depends on a PDCCH configuration on a bandwidth part (BWP) of a carrier, span patterns may vary with different cells, and start symbol locations of PDCCH monitoring spans may also vary with the different cells. Therefore, time domain locations of the PDCCH monitoring spans of the different cells may not be aligned. Consequently, a capability of monitoring a PDCCH cannot be allocated between different cells at a granularity of the PDCCH monitoring span.

SUMMARY

According to a first aspect, an embodiment of this application provides a physical downlink control channel monitoring method. The method may be performed by a terminal device or a network device, or may be performed by a communication apparatus, for example, a chip, used for the terminal device or the network device.

The method includes: determining M cell sets, where M is a positive integer, and each of the M cell sets includes at least one cell of a terminal device; allocating a first monitoring capability of the terminal device to the first cell set based on a proportion of a quantity of cells included in a first cell set in a total quantity of cells configured by a network device for the terminal device, where the first cell set is one of the M cell sets; and allocating, between cells in the first cell set, a monitoring capability allocated to the first cell set, to separately monitor a physical downlink control channel of each cell in the first cell set. The first cell set includes one cell of the terminal device. Alternatively, the first cell set includes at least two cells of the terminal device. Each cell in the first cell set has a same span pattern (span pattern), an aligned span location, and a same subcarrier spacing.

The at least two cells included in the first cell set may include at least two secondary cells (SCell) of the terminal device, or include a primary cell (PCell) of the terminal device and at least one SCell of the terminal device.

In a possible implementation of the first aspect, the first monitoring capability of the terminal device is determined based on a maximum quantity of cells supported by the terminal device to monitor a physical downlink control channel and a monitoring capability corresponding to a span pattern corresponding to the first cell set.

In a possible implementation of the first aspect, the first monitoring capability includes a maximum quantity of times that the terminal device monitors a candidate physical downlink control channel, and/or a maximum quantity of non-overlapping control channel elements used to monitor the candidate physical downlink control channel.

In a possible implementation of the first aspect, the maximum quantity of times that the terminal device monitors the candidate physical downlink control channel of the first cell set may be obtained through calculation according to the following formula:

$$M_{PDCCH}^{total,cell\,set\,i,(X,Y),\mu} = \left\lfloor N_{cell}^{cap} \cdot M_{PDDCH}^{max,(X,Y),\mu} \cdot \left(N_{cell}^{DL,cell\,set\,i,(X,Y),\mu}\right) \Big/ \sum_{j=0}^{1} \left(N_{cell}^{DL,j}\right) \right\rfloor$$

$$M_{PDCCH}^{total,cell\,set\,i,(X,Y),\mu}$$

represents the maximum quantity of times that the terminal device monitors the candidate physical downlink control channel of the first cell set. A subcarrier spacing of each cell in the first cell set is configured as A span pattern is (X, Y). A value of μ is 0 or 1. A value of (X, Y) is one of a set {(2, 2), (4, 3), (7, 3)}. i is an index of the first cell set in the M cell sets, and i is a nonnegative integer less than or equal to M.

$$N_{cell}^{cap}$$

represents a maximum quantity of cells supported by the terminal device to monitor the physical downlink control channel.

$$M_{PDCCH}^{max,(X,Y),\mu}$$

represents a maximum quantity of times that the terminal device monitors the candidate physical downlink control channel in a span of a cell whose subcarrier spacing is μ and span pattern is (X, Y).

$$N_{cell}^{DL,cell\ set\ i,(X,Y),\mu}$$

represents a quantity of cells whose subcarrier spacing configured by the network device for the terminal device is span pattern is (X, Y), and span locations are aligned.

$$\sum_{j=0}^{1}\left(N_{cell}^{DL,j}\right)$$

represents a total quantity of cells configured by the network device for the terminal device. j represents a subcarrier spacing configuration, and a value of j is 0 or 1.

In a possible implementation of the first aspect, the maximum value of the quantity of the non-overlapping control channel elements that are used by the terminal device to monitor the candidate physical downlink control channel of the first cell set may be obtained through calculation according to the following formula:

$$C_{PDCCH}^{total,cell\ set\ i,(X,Y),\mu} = \left\lfloor N_{cell}^{cap} \cdot C_{PDDCH}^{max,(X,Y),\mu} \cdot \left(N_{cell}^{DL,cell\ set\ i,(X,Y),\mu}\right) \Big/ \sum_{j=0}^{1}\left(N_{cell}^{DL,j}\right) \right\rfloor$$

$$C_{PDCCH}^{total,cell\ set\ i,(X,Y),\mu}$$

represents the maximum quantity of the non-overlapping control channel elements used by the terminal device to monitor the candidate physical downlink control channel of the first cell set. A subcarrier spacing of each cell in the first cell set is configured as μ. A span pattern is (X, Y). A value of μ is 0 or 1. A value of (X, Y) is one of a set {(2, 2), (4, 3), (7, 3)}. i is an index of the first cell set in the M cell sets, and i is a nonnegative integer less than or equal to M.

$$N_{cell}^{cap}$$

represents a maximum quantity of cells supported by the terminal device to monitor the physical downlink control channel.

$$C_{PDDCH}^{max,(X,Y),\mu}$$

represents a maximum quantity of non-overlapping control channel elements used by the terminal device to monitor the candidate physical downlink control channel in a span of a cell whose subcarrier spacing is μ and span pattern is (X, Y).

$$N_{cell}^{DL,cell\ set\ i,(X,Y),\mu}$$

represents a quantity of cells whose subcarrier spacing configured by the network device for the terminal device is μ, span pattern is (X, Y), and span locations are aligned.

$$\sum_{j=0}^{1}\left(N_{cell}^{DL,j}\right)$$

represents a total quantity of cells configured by the network device for the terminal device, j represents a subcarrier spacing configuration, and a value of j is 0 or 1.

In a possible implementation of the first aspect, that each cell in the first cell set has an aligned span location specifically includes: When a second span overlaps a first span, a start symbol of the first span is the same as a start symbol of the second span, and a quantity of symbols occupied by the first span is the same as a quantity of symbols occupied by the second span. The first span is a span in a first cell, and the second span is a span in a second cell. The first cell and the second cell belong to the first cell set.

In a possible implementation of the first aspect, the method further includes: determining N time units of the first cell set in one slot, where the N time units do not overlap each other, and N is a positive integer. That each cell in the first cell set has an aligned span location specifically includes: A third span partially or completely overlaps a first time unit, and does not overlap another time unit in the N time units other than the first time unit. The third span is a span in a cell in the first cell set. The first time unit is one of the N time units.

Optionally, an index of a start symbol of the first time unit in the N time units is a smallest index in indexes of start symbols of all spans in the cell set. Optionally, an index of a start symbol of the second time unit in the N time units is a smallest index in indexes of start symbols of spans that are in all the spans in the cell set and that do not overlap the first time unit.

According to the physical downlink control channel monitoring method provided in the foregoing aspect, cells whose spans are not aligned are grouped into different cell sets for differentiation, and then a capability of monitoring a PDCCH is allocated between the cell sets through calculation according to a formula or through a mapping relationship. Because locations of spans of cells of a cell set are aligned, this resolves a problem that in a CA scenario, a monitoring capability corresponding to a span in each cell cannot be determined because spans of different cells are not aligned, so that the terminal can monitor the physical downlink control channel at a granularity of a span.

According to a second aspect, an embodiment of this application provides a physical downlink control channel monitoring method. The method may be performed by a terminal device or a network device, or may be performed by a communication apparatus, for example, a chip, used for the terminal device or the network device.

The method includes: determining that a first monitoring capability of a terminal device is used to monitor a physical downlink control channel of a cell set of the terminal device, where the cell set includes at least two cells of the terminal device, and each cell in the cell set has a same span pattern and a same subcarrier spacing; determining N non-overlapping time units of the cell set in one slot, where a start location of each of the N time units is based on a span of a cell in the cell set, and N is a positive integer; and allocating the first monitoring capability in the cell set based on the N time units, to separately monitor a physical downlink control channel of each cell in the cell set.

Optionally, the at least two cells of the terminal device include at least two SCells of the terminal device, or include a primary cell PCell of the terminal device and at least one SCell of the terminal device.

In a possible implementation of the second aspect, the allocating the first monitoring capability in the cell set based on the N time units includes:

- when symbols occupied by a first span of a first cell partially or completely overlap with a first time unit, allocating a part or all of the first monitoring capability to the first cell based on a quantity of all symbols occupied by a span of the first cell. The first cell is a cell in the cell set. The first time unit is one of the N time units.

In a possible implementation of the second aspect, the allocating the first monitoring capability in the cell set based on the N time units includes: when symbols occupied by a span of a second cell partially or completely overlap with a second time unit, allocating a part or all of the first monitoring capability to the second cell based on a proportion of a quantity of symbols in an overlapping part in a quantity of symbols occupied by the span of the second cell. The second cell is a cell in the cell set. The second time unit is one of the N time units.

According to the physical downlink control channel monitoring method provided in the foregoing aspects, a time unit is used as a basis for allocating a monitoring capability of a physical downlink channel, to resolve a problem that in a CA scenario, a monitoring capability corresponding to a span in each cell cannot be determined because spans of different cells are not aligned. Further, the terminal device can monitor, at a granularity of a span, a candidate physical downlink control channel of each cell based on a monitoring capability allocated to each cell.

In a possible implementation of the first aspect or the second aspect, each span of each cell in the cell set is located in one of the N time units. In other words, each span cannot cross a boundary of a time unit.

In a possible implementation of the first aspect or the second aspect, a quantity of consecutive symbols included in the one of the N time units is the same as a minimum symbol spacing between start symbols of two adjacent spans indicated by the span pattern. For example, the span pattern is (X, Y), and the quantity of consecutive symbols included in the time unit, that is, a length of the time unit, is equal to X.

In a possible implementation of the first aspect or the second aspect, when a monitoring capability is allocated to cells of a cell set, if the cell set includes a PCell and an SCell, the monitoring capability is preferentially allocated to the PCell. In addition, if the cell set includes only an SCell, the monitoring capability may be preferably allocated to a primary secondary cell (primary SCell).

According to a third aspect, this application further provides a communication apparatus, including units or means configured to perform the steps in the first aspect or the second aspect.

According to a fourth aspect, this application further provides a communication apparatus, including a processor and an interface circuit. The processor is configured to communicate with another apparatus through the interface circuit, and perform the method provided in the first aspect or the second aspect. There are one or more processors.

According to a fifth aspect, this application further provides a communication apparatus, including a processor, configured to invoke a program stored in a memory, to perform the method provided in the first aspect or the second aspect. The memory may be located inside or outside the apparatus. In addition, there are one or more processors.

According to a sixth aspect, this application further provides a computer program. When the program is invoked by a processor, the method provided in the first aspect or the second aspect is performed.

In addition, a computer-readable storage medium is provided, including the foregoing program.

BRIEF DESCRIPTION OF DRAWINGS

FIG. 11 is a schematic diagram of another cell set, according to an embodiment of this application;

DESCRIPTION OF EMBODIMENTS

Figure 1:
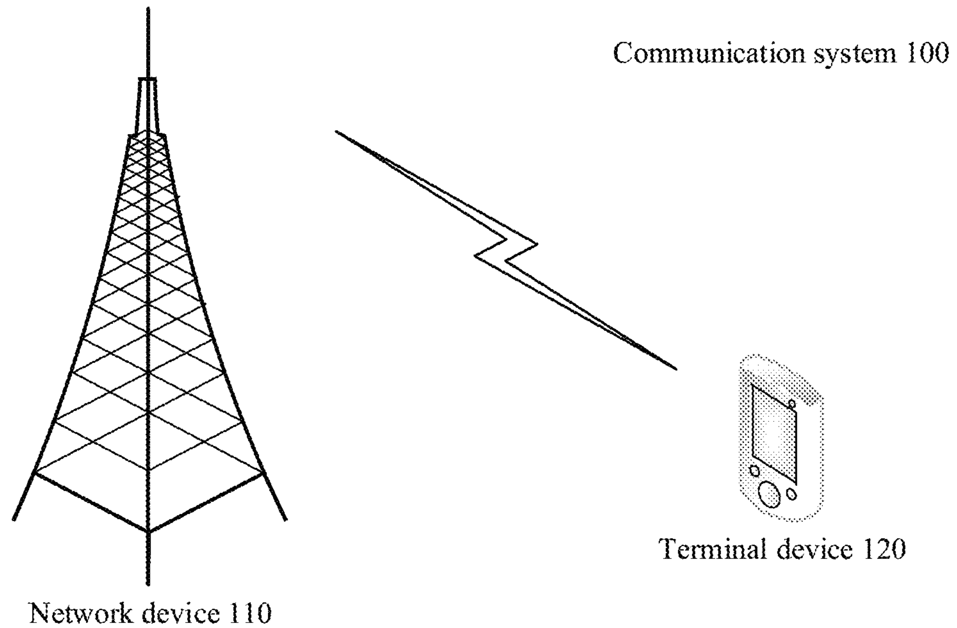
FIG. 1 is a schematic diagram of a communication system 100, according to an embodiment of this application.

FIG. 1 is a schematic diagram of a communication system 100 according to an embodiment of this application.

As shown in FIG. 1, the communication system 100 includes a network device 110 and a terminal device 120. The terminal device 120 communicates with the network device 110 by using an electromagnetic wave. When the terminal device 120 sends information, a wireless communication module of the terminal device 120 may obtain information bits that need to be sent to the network device 110 over a channel. For example, the information bits are information bits generated by a processing module of the terminal device, received from another device, or stored in a storage module of the terminal device. Specifically, the terminal device 120 may be used as an entity that sends uplink data to send an uplink channel (where the uplink channel may carry the uplink data) to the network device 110. Certainly, the terminal device 120 may also receive downlink data directly sent by the network device 110 or forwarded by a network node such as a relay device.

It should be understood that, as an example, FIG. 1 shows a network device and a terminal device. Optionally, the communication system 100 may include a plurality of network devices, and another quantity of terminal devices may be included within coverage of each network device. This is not limited in this embodiment of this application.

In this application, the terminal device 120 may be a device of various types that provides a user with voice and/or data connectivity, for example, may be a handheld device with a wireless connection function, or a processing device connected to a wireless modem. The terminal device 120 may communicate with a core network through an access network, for example, a radio access network (RAN), and exchange a voice and/or data with the RAN. The terminal device 120 may also be referred to as a terminal, user equipment (UE), a mobile station, a mobile, a remote station, an access point (AP), a remote terminal device, an access terminal device (access terminal), a user terminal, a user equipment (user device), or the like. For example, the terminal device may include a mobile phone (or referred to as a "cellular" phone), a computer with a mobile terminal device, a portable, pocket-sized, handheld, computer built-in, or vehicle-mounted mobile apparatus, a smart wearable device, or an unmanned aerial vehicle device. In embodiments of this application, a chip used in the foregoing device may also be referred to as a terminal device.

In this application, the network device 110 may be an access network device, and the access network device may be configured to connect the terminal device 110 to an access network such as a RAN. The network device 110 may be a base station defined in the 3rd Generation Partnership Project (3GPP), for example, may be a base station device in an LTE system, that is, an evolved NodeB (eNB/eNodeB), or may be an access network side device in a 5G new radio (NR) system, including a gNB and a transmission reception point (TRP), or may be a central unit (CU) or a distributed unit (DU). The CU may also be referred to as a control unit. A protocol layer of the base station is split by using a CU-DU structure. Some functions of the protocol layer are centrally controlled by the CU, and some or all remaining functions of the protocol layer are distributed in the DU. The CU centrally controls the DU. In addition, when the eNB is connected to a 5G core network (CN), the LTE eNB may also be referred to as an eLTE eNB. Specifically, the eLTE eNB is an evolved LTE base station device based on the LTE eNB, and may be directly connected to the 5G CN. The eLTE eNB also belongs to a base station device in NR. The network device 110 may alternatively be access point (AP), an access controller (AC), or another network device, for example, a relay device, a vehicle-mounted device, or an intelligent wearable device, that has a capability of communicating with a terminal and a core network. A type of the network device is not limited in this embodiment of this application.

The following describes related technical features of monitoring the PDCCH by the terminal device.

Figure 2:
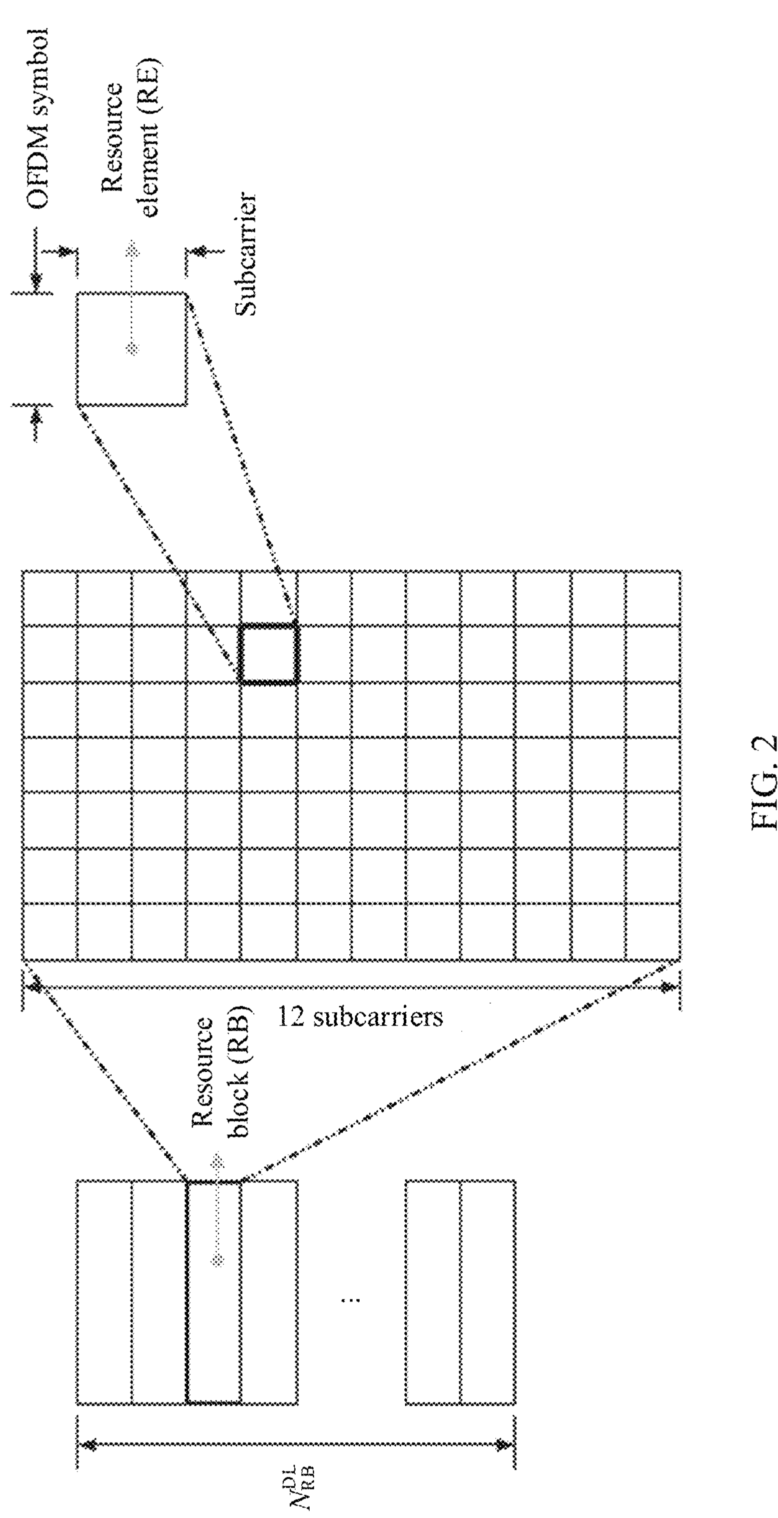
FIG. 2 is a schematic diagram of a downlink time-frequency resource grid.

An NR system is used as an example. The NR system is divided into independent subcarriers in frequency domain, and a subcarrier spacing (SCS) may be determined based on a subcarrier spacing configuration μ. For example, when μ=0, the subcarrier spacing is 15 kHz, and when μ=1, the subcarrier spacing is 30 kHz. A unit of an uplink/a downlink frequency domain resource may be a resource block (RB), and each RB includes 12 consecutive subcarriers in frequency domain. FIG. 2 shows a downlink time-frequency resource grid. In FIG. 2, $$N_{RB}^{DL}$$

represents a quantity of RBs scheduled in downlink once, and one RB includes 12 consecutive subcarriers in frequency domain. Each element on the resource grid is referred to as a resource element (RE). The RE is a minimum physical resource and corresponds to one subcarrier in one symbol. An uplink time-frequency resource grid is similar to the downlink time-frequency resource grid. In an NR system, one slot includes 12 or 14 symbols in terms of time, and each OFDM symbol may be represented by one index. A symbol or a time domain symbol in this application is an orthogonal frequency division multiplexing (OFDM) symbol.

The PDCCH is transmitted in a control-resource set (CORESET), the CORESET includes a plurality of RBs in frequency domain and includes one symbol or several consecutive symbols in time domain, and the symbols may be located in any positions in a slot.

A control channel element (CCE) is a basic unit carrying the PDCCH, and each CCE in the CORESET has one corresponding index number. A given PDCCH may be carried by one CCE, two CCEs, four CCEs, eight CCEs, or 16 CCEs, and a quantity of CCEs carrying a PDCCH may be determined based on a DCI payload size and a needed coding rate. The quantity of CCEs carrying the PDCCH is also referred to as an aggregation level (AL). The network side device may adjust the aggregation level of the PDCCH based on a status of an actually transmitted radio channel, to implement link adaptive transmission. One CCE includes six resource element groups (REG). One REG occupies one OFDM symbol in time domain, and occupies one RB in frequency domain.

A search space is a set of candidate PDCCHs (PDCCH candidate) at an aggregation level. The candidate PDCCH may be a PDCCH to be blindly detected or to be monitored. The network device may configure, for the terminal device by using higher layer signaling such as radio resource control (RRC) signaling, a candidate PDCCH set that needs to be monitored. Further, the terminal device detects all candidate PDCCHs in the search space and attempts to decode the candidate PDCCHs. If a cyclic redundancy check (CRC) check succeeds, it is considered that the terminal device receives a PDCCH sent by the network device, and the terminal device may continue to perform subsequent related processing based on content indicated by the PDCCH.

A meaning of "monitoring a PDCCH" described in this application is the same as a meaning of "monitoring a candidate PDCCH" or "monitoring a PDCCH candidate (s)". Details are not described below again.

Because complexity of detecting the PDCCH is relatively high, the terminal device consumes a large amount of power. Therefore, in the NR system, a monitoring capability (or referred to as a blind detection capability) corresponding to one slot may be set, to limit power consumption of detecting the PDCCH by the terminal device in one slot. The monitoring capability in this application is a PDCCH monitoring capability. The monitoring capability corresponding to one slot may include: (1) a maximum quantity of times that the terminal device monitors a candidate PDCCH in one slot; and/or (2) a maximum quantity of non-overlapping CCEs that are used by the terminal device to monitor the PDCCH in one slot. For (1), for example, the maximum monitoring times of monitoring the PDCCH in one slot may be a maximum monitoring times that can be completed by the terminal device in one slot. For (2), for example, a CCE may be used by the terminal device to perform channel estimation on the PDCCH. A maximum quantity of CCEs used by the terminal device to perform channel estimation in one slot is a maximum quantity of the CCEs that can be used by the terminal device to perform channel estimation in one slot.

Figure 3:
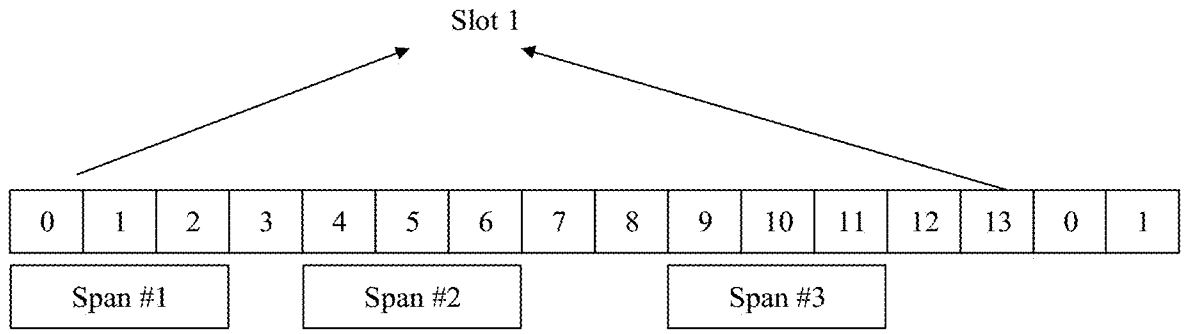
FIG. 3 is a schematic diagram of a span location in a slot.

Considering that a URLLC service is defined in the NR system, to meet a latency requirement of the URLLC service, a time domain unit that occupies fewer symbols than a slot is introduced in the NR system, for example, a span, which may also be referred to as a monitoring time span (monitoring span), a PDCCH monitoring span, or the like. For ease of description, all are referred to as spans in this embodiment of this application. The terminal device may monitor the PDCCH at a granularity of the span, that is, use the span as a unit for measuring a capability of monitoring the PDCCH by the terminal device. Similar to the monitoring capability corresponding to the slot, one span has a corresponding monitoring capability. The monitoring capability of the span may include: (1) a maximum quantity of times that the terminal device monitors the PDCCH in one span, which is referred to as a maximum monitoring times or a maximum quantity of times that the terminal device monitors the PDCCH in this embodiment of this application; and/or (2) a maximum quantity of non-overlapping CCEs used by the terminal device to monitor a PDCCH in a span is referred to as a maximum quantity of CCEs or a maximum quantity of non-overlapping CCEs for short in this embodiment of this application. The monitoring capability used to monitor the PDCCH is allocated at a granularity of each span of each serving cell of the terminal device. A span is contained in a separate slot. A symbol spacing between two adjacent spans may cross boundaries of two slots. Each PDCCH MO is included in one span, and one PDCCH MO cannot cross a boundary of the span. The PDCCH MO may be jointly determined by using a start location for monitoring a PDCCH in one search space (SS) and a CORESET associated with the SS. For example, division of spans in a slot may be preset by a protocol or configured by a network device by using a higher-layer parameter, or the terminal device may determine the division of spans in a slot based on a preset rule of a protocol and a higher-layer parameter. One span includes one or more consecutive symbols. Lengths of spans in one slot may be the same or different. For example, in one slot, some spans each have a length of 10 symbols, and some spans each have a length of one or 2 symbols. FIG. 3 is a schematic diagram of a span location in a slot. The slot (the slot 1) includes 14 symbols (a symbol 0 to a symbol 13), and a span #1 to a span #3 each occupy three consecutive symbols.

A span may be described by using a span pattern. Generally, one span pattern may be represented by using a parameter combination (X, Y), where X represents a minimum symbol spacing between start symbols of two spans, Y represents a maximum time domain length of one span or a maximum quantity of consecutive symbols that can be occupied by one span. X is greater than or equal to Y. In this application, the span pattern (X, Y) may also be represented by (X, Y).

In a carrier aggregation (CA) scenario, when a CA capability supported by the terminal device exceeds four cells, the terminal device needs to report a PDCCH monitoring capability in the CA scenario to the network device. For example, the CA capability supported by the terminal device is eight cells, and it is assumed that the terminal device supports monitoring of a maximum of five PDCCH cells in the CA scenario, the terminal device reports, to the network device, that the PDCCH monitoring capability in the CA scenario is five cells. When a quantity of downlink cells configured by the network device exceeds the PDCCH monitoring capability supported by the terminal device in the CA scenario, a monitoring capability of each cell needs to be allocated by using a mapping relationship or a calculation formula. Further, in a self-scheduling scenario, the terminal device may monitor a PDCCH of each cell in a slot of each cell. Alternatively, in a cross-carrier scheduling scenario, the terminal device monitors a PDCCH of a primary scheduling cell in a slot of the primary scheduling cell, and the PDCCH of the primary scheduling cell may be used to schedule a data channel of the primary scheduling cell, or may schedule a data channel of a scheduled cell. The primary scheduling cell may be a PCell, or the primary scheduling cell may be an SCell. In a cross-carrier scheduling scenario, the terminal device monitors, in the primary scheduling cell, the PDCCH based on the PDCCH configuration information of the primary scheduling cell and the PDCCH configuration information of the scheduled cell associated with the primary scheduling cell. In the 3GPP Release 15 protocol, the terminal device uses one slot as a PDCCH monitoring granularity. For example, for a cell with a subcarrier spacing of 15 kHz, a maximum monitoring times and a maximum quantity of CCEs in one slot are 44 and 56 respectively. For a cell with a subcarrier spacing of 30 kHz, a maximum monitoring times and a maximum quantity of CCEs in a slot are 36 and 56, respectively. It is assumed that the PDCCH monitoring capability supported by the terminal device in the CA scenario is four cells, and the network device configures eight downlink cells. Subcarrier spacings of two cells are 15 kHz, and subcarrier spacings of six cells are 30 kHz. In this case, a PDCCH monitoring capability in a slot is allocated between cells in the following manner.

For the two downlink cells with the subcarrier spacings of 15 kHz, a maximum monitoring times allocated is calculated as follows:

$$M_{PDCCH}^{total,slot,0} = \left\lfloor N_{cells}^{cap} \cdot M_{PDCCH}^{max,slot,0} \cdot N_{cells}^{DL,0} \Big/ \sum_{j=0}^{3} N_{cells}^{DL,j} \right\rfloor = \lfloor 4 \cdot 44 \cdot 2/8 \rfloor = 44$$

$$M_{PDCCH}^{total,slot,0}$$

represents a maximum quantity of times that the terminal device monitors the PDCCH in one slot of a cell whose subcarrier spacing configuration is μ=0 (that is, the subcarrier spacing is 15 kHz) in the CA scenario.

$$N_{cells}^{cap}$$

represents a maximum quantity of cells supported by the terminal device to monitor the PDCCH in the CA scenario.

$$M_{PDCCH}^{max,(X,Y),\mu}$$

represents a maximum quantity of times that the terminal device monitors the PDCCH in one slot of one cell whose subcarrier spacing is 15 kHz.

$$N_{cells}^{DL,0}$$

represents a quantity of cells whose subcarrier spacing is 15 kHz that are configured by the network device for the terminal device.

$$\sum_{j=0}^{3} N_{cells}^{DL,j}$$

represents a total quantity of cells configured by the network device for the terminal device. A value of j is an integer from 0 to 3, j represents a subcarrier spacing configuration, and j has a same meaning as μ.

For the two downlink cells with the subcarrier spacings of 15 kHz, a maximum quantity of CCEs allocated is calculated as follows:

$$C_{PDCCH}^{total,slot,0} = \left\lfloor N_{cells}^{cap} \cdot C_{PDCCH}^{max,slot,0} \cdot N_{cells}^{DL,0} \Big/ \sum_{j=0}^{3} N_{cells}^{DL,j} \right\rfloor = \lfloor 4 \cdot 56 \cdot 2/8 \rfloor = 56$$

$$C_{PDCCH}^{total,slot,1}$$

represents a maximum quantity of CCEs that are used by the terminal device to monitor the PDCCH in one slot of the cell whose subcarrier spacing is 15 kHz in the CA scenario.

$$C_{PDCCH}^{max,slot,1}$$

represents a maximum quantity of CCEs that are used by the terminal device to monitor the PDCCH in one slot of the cell whose subcarrier spacing is 15 KHz. For meanings of other parameters, refer to the foregoing definitions. Details are not described again.

For the six downlink cells with the subcarrier spacings of 30 kHz, a maximum monitoring times allocated is calculated as follows:

$$M_{PDCCH}^{total,slot,1} = \left\lfloor N_{cells}^{cap} \cdot M_{PDCCH}^{max,slot,1} \cdot N_{cells}^{DL,1} \Big/ \sum_{j=0}^{3} N_{cells}^{DL,j} \right\rfloor = \lfloor 4 \cdot 36 \cdot 6/8 \rfloor = 108$$

$$M_{PDCCH}^{total,slot,1}$$

represents a maximum quantity of times that the terminal device monitors the PDCCH in one slot of the cell whose subcarrier spacing configuration is μ=1 (that is, the subcarrier spacing is 30 kHz) in the CA scenario.

$$M_{PDCCH}^{max,slot,1}$$

represents a maximum quantity of times that the terminal device monitors the PDCCH in one slot of a cell whose subcarrier spacing is 30 kHz. For meanings of other parameters, refer to the foregoing definitions. Details are not described again.

For the six downlink cells with the subcarrier spacings of 30 kHz, a maximum quantity of CCEs allocated to each cell is calculated as follows:

$$C_{PDCCH}^{total,slot,1} = \left\lfloor N_{cells}^{cap} \cdot C_{PDCCH}^{max,slot,1} \cdot N_{cells}^{DL,1} \Big/ \sum_{j=0}^{3} N_{cells}^{DL,j} \right\rfloor = \lfloor 4 \cdot 56 \cdot 6/8 \rfloor = 168$$

$$C_{PDCCH}^{total,slot,1}$$

represents a maximum quantity of CCEs that are used by the terminal device to monitor the PDCCH in one slot of a cell with the subcarrier spacing of 30 kHz in the CA scenario.

$$C_{PDCCH}^{max,slot,1}$$

represents a maximum quantity of CCEs that are used by the terminal device to monitor the PDCCH in one slot of a cell whose subcarrier spacing is 30 KHz. For meanings of other parameters, refer to the foregoing definitions. Details are not described again.

Figure 4:
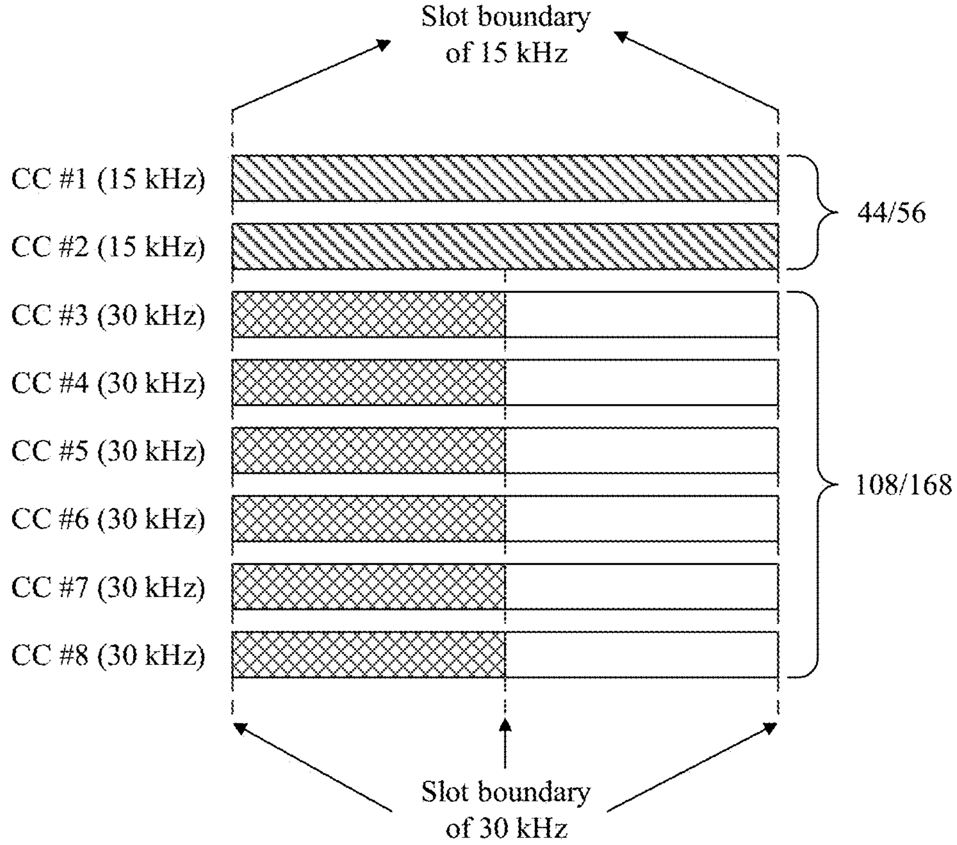
FIG. 4 is a schematic diagram in which span locations of different cells are aligned in a CA scenario.

FIG. 4 is a schematic diagram in which span locations of different cells are aligned in a CA scenario. In FIG. 4, a CC #1 to a CC #8 represent eight downlink cells configured by a network device for a terminal device. Although subcarrier spacing configurations of the eight downlink cells may be different, slot boundaries are determined. In other words, slot boundaries of cells with a same subcarrier spacing are aligned, and cell boundaries of different subcarrier spacings are aligned by integer multiples. A start position of a slot in a cell with a subcarrier spacing of 30 kHz may be in a middle position or may be aligned with a slot in a cell with a subcarrier spacing of 15 kHz. In a slot area, a maximum quantity of monitored CCEs allocated to six cells with a subcarrier spacing of 30 kHz shown in a grid is 108, and a maximum quantity of CCEs is 168. In the slot area, a maximum of 44 CCEs and 56 CCEs are allocated to two cells with a subcarrier spacing of 15 kHz shown by slashes. To be specific, for two cells with a subcarrier spacing of 15 kHz, a maximum quantity of monitored PDCCHs within 1 ms is 44, and a maximum quantity of CCEs is 56. For six cells with a subcarrier spacing of 30 kHz, a maximum of 108 PDCCHs can be monitored within 0.5 ms, and a maximum of 168 CCEs can be monitored.

Figures 5, 6:
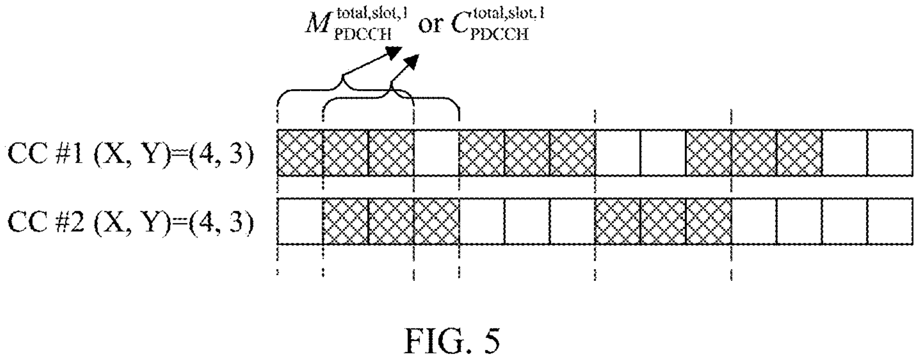
FIG. 5 is a schematic diagram in which span locations of different cells are not aligned in a CA scenario.
FIG. 6 is a schematic flowchart of a PDCCH monitoring method, according to an embodiment of this application.

In a CA scenario, when the terminal device monitors a PDCCH at a granularity of a span, because a span configuration of each cell depends on a PDCCH configuration on a BWP of a carrier, span patterns of different cells may be different, and start symbol locations of spans in different cells may also be different. In other words, time domain locations of spans between different cells may be not-aligned. Further, when a capability of monitoring a PDCCH is allocated between different cells at a granularity of the span, for spans that are partially overlapped and are not aligned, whether these spans need to participate in PDCCH monitoring capability allocation on symbols that do not overlap each other is uncertain. As a result, a capability of monitoring the PDCCH cannot be allocated to a span of each cell. FIG. 5 is a schematic diagram in which span locations of different cells are not aligned in a CA scenario. In FIG. 5, a CC #1 and a CC #2 each represent one cell, and span patterns corresponding to the CC #1 and the CC #2 are both (4, 3).

Therefore, this application proposes a PDCCH monitoring method, to determine a monitoring capability corresponding to a span of a cell of a terminal device in the CA scenario, so that the terminal device monitors a PDCCH in each cell of the terminal device at a granularity of the span.

FIG. 6 is a schematic flowchart of a PDCCH monitoring method according to an embodiment of this application. The method provided in this application may be performed by a terminal device or a network device, or may be performed by a communication apparatus such as a chip used for the terminal device, or may be performed by a communication apparatus such as a chip used for the network device.

As shown in FIG. 6, the method includes the following steps.

S601: Determine that a first monitoring capability of a terminal device is used to monitor a PDCCH of a cell set of the terminal device, where the cell set includes at least two cells of the terminal device, and each cell in the cell set has a same span pattern and a same subcarrier spacing.

It may be understood that the PDCCH is an example of a downlink control channel of a physical layer. In different systems, the downlink control channel may have different names. This is not limited in this application. In embodiments of this application, the PDCCH is used as an example for description.

In this application, monitoring the PDCCH of the cell set of the terminal device may mean that the terminal device monitors candidate PDCCHs of all cells in the cell set. Specifically, if a self-scheduling manner is used, the terminal device separately monitors, in each cell in the cell set, a PDCCH sent by the cell. If a cross-carrier scheduling manner is used, the terminal device monitors a PDCCH of a primary scheduling cell in the cell set, and the PDCCH of the primary scheduling cell may be used to schedule a data channel of the primary scheduling cell, or may schedule a data channel of a scheduled cell. In a self-scheduling scenario, the PDCCH of the cell refers to a PDCCH that is sent by the cell and that is used to schedule a data channel of the cell. In a cross-carrier scheduling scenario, the PDCCH of the cell refers to a PDCCH for scheduling a data channel of the cell. If the cell is the primary scheduling cell, the PDCCH is sent in the primary scheduling cell. If the cell is the scheduled cell, the PDCCH is sent in the primary scheduling cell that schedules the scheduled cell. In the cross-carrier scheduling scenario, the terminal device may monitor, in the primary scheduling cell, the PDCCH based on PDCCH configuration information of the primary scheduling cell and PDCCH configuration information of the scheduled cell associated with the primary scheduling cell.

In this application, a cell of a terminal device may be a serving cell that establishes a wireless connection to the terminal device, and the terminal device may perform wireless communication with the cell.

The at least two cells included in the cell set may include at least two SCells of the terminal device, or include a PCell of the terminal device and at least one SCell of the terminal device. Specifically, the network device may configure one PCell and at least one SCell for the terminal device, to implement communication between the network device and the terminal device in a CA manner. The PCell and the SCell may have a same subcarrier spacing or different subcarrier spacings. The SCell may be a PSCell, or includes a PSCell and another secondary cell other than the PSCell, where there is only one PSCell. It should be noted that the cell (the PCell or the SCell) described in this application is a downlink cell, and a “cell” is directly used for description in the following.

For example, a manner of determining the cell set is described as follows: It is assumed that a PCell and an SCell #1 with a subcarrier spacing of 15 kHz, and an SCell #2 and an SCell #3 with a subcarrier spacing of 30 kHz are configured for the terminal device. A span pattern of the PCell is (4, 3), a span pattern of the SCell #1 is (4, 3), a span pattern of the SCell #2 is (2, 2), and a span pattern of the SCell #3 is (2, 2). Because the PCell and the SCell #1 have a same subcarrier spacing and a same span pattern, the PCell and the SCell #1 are grouped into one cell set. Because the SCell #2 and the SCell #3 have a same subcarrier spacing and a same span pattern, the SCell #2 and the SCell #3 are grouped into another cell set.

Optionally, the first monitoring capability includes a maximum monitoring times and/or a maximum quantity of CCEs.

Optionally, in an implementation of this application, the determining a first monitoring capability of a terminal device includes: determining the first monitoring capability of the terminal device based on a total capability value that corresponds to the span pattern of the cell set and that is of the terminal device and that supports PDCCH monitoring, and a proportion of a quantity of cells in the cell set in a total quantity of cells configured by the network device for the terminal device. Optionally, the total capability value of performing PDCCH monitoring by the terminal device is determined based on a maximum quantity of cells supported by the terminal device to perform PDCCH monitoring in the CA scenario and a monitoring capability corresponding to the span pattern of the cell set. It may be understood that the maximum quantity of cells supported by PDCCH monitoring performed by the terminal device is less than the total quantity of cells configured by the network device for the terminal device. If the total quantity of cells configured by the network device for the terminal device is equal to a quantity of cells supported by the terminal device to perform PDCCH monitoring, it indicates that the capability of the terminal device can support monitoring of PDCCHs of all cells configured for the terminal device, and allocation of a monitoring capability is not involved.

Optionally, in an implementation of this application, the maximum monitoring times in the first monitoring capability is calculated according to the following formula (1):

$$M_{PDCCH}^{total,(X,Y),\mu} = \left\lfloor N_{cells}^{cap} \cdot M_{PDCCH}^{max,(X,Y),\mu} \cdot \left(N_{cell}^{DL,(X,Y),\mu}\right) \Big/ \sum_{j=0}^{1}\left(N_{cell}^{DL,j}\right) \right\rfloor \quad \text{formula (2)}$$

$$M_{PDCCH}^{total,(X,Y),\mu}$$

represents the maximum quantity of times that the terminal device monitors the PDCCH of the cell set. A subcarrier spacing of each cell in the cell set is configured as A span pattern is (X, Y). A value of μ is 0 or 1. μ=0 indicates that the subcarrier spacing is 15 kHz, and μ=1 indicates that the subcarrier spacing is 30 kHz. A value of (X, Y) is one of a set {(2, 2), (4, 3), (7, 3)}.

$$N_{cells}^{cap}$$

represents a maximum quantity of cells supported by the terminal device to monitor the PDCCH in the CA scenario.

$$M_{PDCCH}^{max,(X,Y),\mu}$$

represents a maximum quantity of times that the terminal device monitors a PDCCH in a span of a cell whose subcarrier spacing is configured as μ and whose span pattern is (X, Y).

$$N_{cell}^{DL,(X,Y),\mu}$$

represents a quantity of cells whose subcarrier spacing configured by the network device for the terminal device is μ and whose span pattern is (X, Y), that is, represents a quantity of cells in the cell set i.

$$\sum_{j=0}^{1}\left(N_{cell}^{DL,j}\right)$$

represents a total quantity of cells configured by the network device for the terminal device. A value of j is 0 or 1, j represents a subcarrier spacing configuration, and j has a same meaning as μ.

Optionally, in an implementation of this application, the maximum quantity of CCEs in the first monitoring capability is calculated according to the following formula (2):

$$C_{PDCCH}^{total,(X,Y),\mu} = \left\lfloor N_{cells}^{cap} \cdot C_{PDCCH}^{max,(X,Y),\mu} \cdot \left(N_{cell}^{DL,(X,Y),\mu}\right) \Big/ \sum_{j=0}^{1}\left(N_{cell}^{DL,j}\right) \right\rfloor \quad \text{formula (2)}$$

$$C_{PDCCH}^{total,(X,Y),\mu}$$

represents a maximum quantity of CCEs used by the terminal device to monitor the PDCCH in the cell set.

$$C_{PDCCH}^{max,(X,Y),\mu}$$

represents a maximum quantity of CCEs used by the terminal device to monitor a PDCCH in one span of a cell whose subcarrier spacing is configured as μ and whose span pattern is (X, Y). Physical meanings of variables with a same name in formula (2) and formula (1) are the same, and details are not described again.

For example, the network configuration configures five cells in total for the terminal device: a PCell, an SCell #1, and an SCell #2 whose subcarrier spacing is 15 kHz, and an SCell #3 and an SCell #4 whose subcarrier spacing is 30 kHz. Span patterns of the PCell and the SCell #1 are (4, 3). A span pattern of the SCell #2 is (2, 2). Span patterns of the SCell #3 and the SCell #4 are (7, 3). The PCell and the SCell #1 belong to a cell set cell set 1, and the SCell #3 and the SCell #4 belong to a cell set cell set 2. It is assumed that the terminal device supports a maximum of four cells for monitoring on a PDCCH in a CA scenario, a maximum monitoring times of a span pattern (4, 3) corresponding to a cell with a subcarrier spacing of 15 KHz is 44, and a maximum monitoring times of a span pattern (7, 3) corresponding to a cell with a subcarrier spacing of 30 KHz is 36. A maximum quantity of monitoring times of the cell set 1

$$M_{PDCCH}^{total,(7,3),\mu=0} = \left\lfloor \frac{4\times 44\times 2}{5} \right\rfloor = 70$$

is calculated by using formula (1). A maximum quantity of monitoring times of the cell set 2

$$M_{PDCCH}^{total,(7,3),\mu=1} = \left\lfloor \frac{4\times 36\times 2}{5} \right\rfloor = 57$$

is calculated by using formula (1). In other words, in the CA scenario, in a cell whose subcarrier spacing is 15 kHz and whose span pattern is (4, 3), a total quantity of times of monitoring a PDCCH at a granularity of a span does not exceed 70. In a cell with the subcarrier spacing of 30 kHz and the span pattern of (7, 3), a total quantity of times of monitoring the PDCCH at a granularity of the span does not exceed 57. A calculation manner of the maximum quantity of the CCEs is similar, and details are not described again.

It may be understood that the foregoing formulas (1) to (2) may also be used to calculate a maximum monitoring times/a maximum quantity of CCs corresponding to the SCell #2. However, because the SCell #2 does not belong to a cell set, or the SCell #2 is independently used as a cell set, for SCell #2, monitoring capabilities do not need to be allocated between different cells in the cell set by using the method described in subsequent S602 to S603.

S602: Determine N time units of the cell set in one slot, where a start location of each of the N time units is based on a span of a cell in the cell set, and N is a positive integer.

The time unit may also be referred to as a time window or a symbol set, and includes a group of consecutive time domain symbols.

That the N time units do not overlap each other includes: Time domain symbols included in any two of the N time units do not overlap at all. In other words, locations of any two of the N time units do not overlap at all.

Optionally, in an implementation of this application, an index of a start symbol of the first time unit in the N time units is a smallest index in indexes of start symbols of all spans in the cell set.

Specifically, the first time unit may be a first time unit that appears in a slot, that is, a first time unit in a first slot. A start symbol location of the first time unit is based on a span with a smallest index in indexes of start symbols of all spans in the cell set. To be specific, a location of an earliest span (referred to as a "first span" below) in all spans is determined, and an index of a start symbol of the first time unit is the same as an index of a start symbol of the first span.

Optionally, in an implementation of this application, a location of a time unit other than the first time unit in the N units is determined based on an index of a start symbol of a span that is in all spans in the cell set and that does not overlap an adjacent time unit before the time unit. Non-overlapping means that occupied symbols do not overlap at all. For example, a second time unit is defined as a time unit adjacent to the first time unit, and the second time unit is after the first time unit. An index of a start symbol of the second time unit is a smallest index in indexes of start symbols of spans that are in all spans in the cell set and that do not overlap with the first time unit. For another example, a third time unit is defined as a time unit adjacent to the second time unit, and the third time unit is after the first time unit and the second time unit. An index of a start symbol of the third time unit is a smallest index in indexes of start symbols of spans that do not overlap the second time unit and that are in all spans in the cell set except the span included in the first time unit. According to this rule, a start symbol location of each of the remaining N time units may be determined. Details are not described again. It may be understood that, because the N time units do not overlap each other, only a span that appears after a previous time unit adjacent to the time unit may be considered for determining a start symbol location of a time unit other than the first time unit. If a span appears before the adjacent previous time unit, even if the span does not overlap the adjacent previous time unit, the span is not considered for determining a start symbol location of the time unit. For example, in the foregoing process of determining the start symbol location of the third time unit, even if the first span does not overlap the second time unit, because the first span is before the second time unit, the first span is not considered. In addition, it should be noted that "before" and "after" in this application both represent an appearance sequence in a time sequence, and may be determined by using an index value of a start symbol of a time unit or a span.

Optionally, in an implementation of this application, the network device preconfigures that each span of each cell in the cell set is located in one time unit of the N time units. In other words, one span cannot cross boundaries of two or more time units. Complexity of calculating a monitoring capability corresponding to the span can be reduced. In another implementation, a span location of another cell may not be limited. One span of any cell in the cell set may be located in two or more time units, that is, may cross boundaries of two or more time units. Alternatively, a part of symbols of a span are located in one time unit, and a remaining part of symbols are located outside the time unit, but the remaining symbols do not belong to another time unit. In this implementation, span configuration is highly flexible, and may be applicable to various communication scenarios. In the following implementations, a span location is not limited is used for description.

Optionally, in an implementation of this application, a quantity of consecutive symbols included in the one of the N time units is the same as a minimum symbol spacing between start symbols of two adjacent spans indicated by the span pattern. Specifically, as described above, the span pattern may be represented as (X, Y). In this case, a quantity of consecutive symbols included in the time unit, or a length of the time unit is X symbols.

Figures 7, 8:
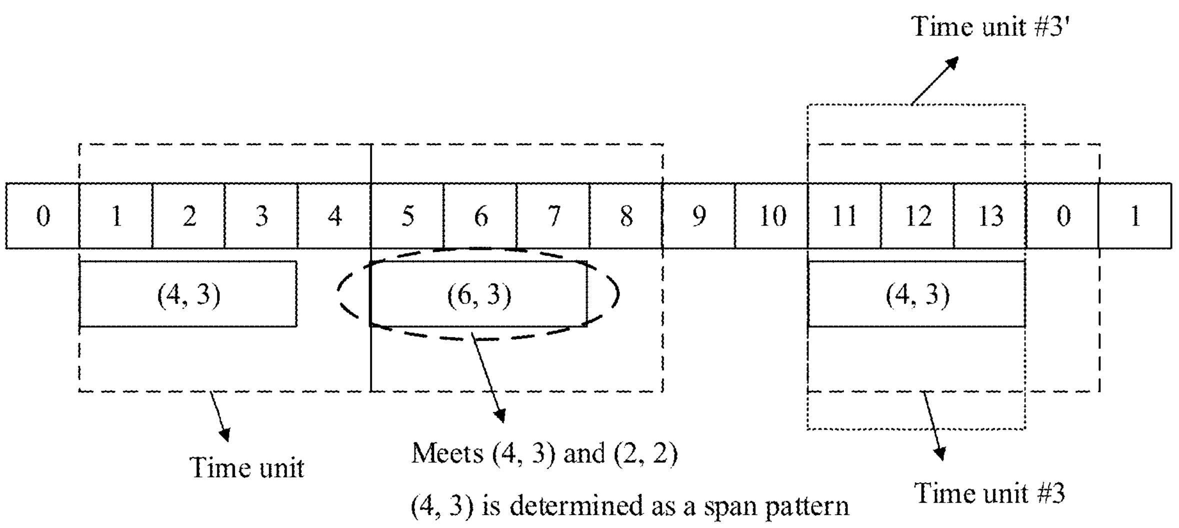
FIG. 7 is a schematic diagram of a time unit, according to an embodiment of this application.
FIG. 8 is a schematic diagram of time unit division of a cell set, according to an embodiment of this application.

Optionally, lengths of the N time units may be the same, for example, all lengths are X symbols. In a possible scenario, a time unit whose start symbol index is the largest in the N time units, that is, a last time unit in a slot, may cross boundaries of two slots. For example, as shown in FIG. 7, a slot occupies 14 symbols from a symbol 0 to a symbol 13. A span pattern of a cell is (4, 3). A location of a first span in the slot are a symbol 1, a symbol 2, and a symbol 3. A location of a second span is a symbol 5, a symbol 6, and a symbol 7. A location of a third span is a symbol 11, a symbol 12, and a symbol 13. In this implementation, a location of the time unit (a time unit #3) determined based on the third span is the symbol 11, the symbol 12, the symbol 13, and a symbol 0 of a next slot in the current slot. In other words, the time unit #3 crosses a slot boundary.

Optionally, some of the N time units have different lengths. For example, it may be limited that a last time unit in one slot does not cross boundaries of two slots. In other words, a length of the last time unit is limited by a boundary of a slot in which the last time unit is located, and the length of the last time unit may be less than X. In other words, the length of the last time unit is equal to a minimum value of a quantity of symbol spacings between a start symbol of the last time unit and a slot boundary and X. Still as shown in FIG. 7, a length of the time unit (the time unit #3') determined based on the third span is X and a minimum value between a start symbol of the third span and a quantity of symbols at a current slot boundary, that is, $\min\{4, 13-11+1\}=3$. In this case, a location of the time unit #3' is the symbol 11, the symbol 12, and the symbol 13 of the current slot, and does not exceed the slot boundary.

Refer to FIG. 8, a relationship between a time unit and a span of each cell of a cell set is described. A cell set shown in FIG. 8 includes a PCell and an SCell. Subcarrier spacings of both the PCell and the SCell are 15 kHz. Span patterns of both the PCell and the SCell are (4, 3). A length of each span in the PCell or the SCell is three symbols. A minimum symbol spacing between two spans in a same cell is four symbols. The PCell has a span #1, a span #2, and a span #3 in a slot 1. The SCell has a span #4, a span #5, and a span #6 in the slot 1. The slot 1 includes 14 symbols (a symbol 0 to a symbol 13) whose index numbers are 0 to 13. For the PCell, a start symbol location of the span #1 is the symbol 0, and the span #1 occupies the symbol 0 to the symbol 2. A spacing between a start symbol location of the span #2 and a start symbol location of the span #1 is four symbols. The span #2 occupies the symbol 4 to the symbol 6. A spacing between a start symbol location of the span #3 and a start symbol location of the span #2 is five symbols. The span #3 occupies the symbol 9 to the symbol 11. For the SCell, a start symbol location of the span #4 is the symbol 2, and the span #4 occupies the symbol 2 to the symbol 4. A spacing between the start symbol locations of the span #5 and the span #4 is four symbols. The span #5 occupies the symbol 6 to the symbol 8. A spacing between start symbol locations of the span #6 and the span #5 is four symbols. The span #6 occupies the symbol 10 to the symbol 12.

As shown in FIG. 8, the span #1 is a span with a smallest start symbol index in all spans. Therefore, the start symbol location of the span #1 may be used as a start symbol location of a time unit #1. The span #2 has a smallest start symbol index in all spans that do not overlap the time unit #1. Therefore, the start symbol location of the span #2 may be used as a start symbol location of a time unit #2. The span #3 has a smallest start symbol index in all spans (except the span #1) that do not overlap the time unit #2. Therefore, a start symbol location of the span #3 may be used as a start location of the time unit #3. In addition, lengths of the time unit #1 to the time unit #3 are all equal to X in the span pattern corresponding to the cell set, that is, four symbols. Therefore, the time unit #1 occupies the symbol 0 to the symbol 3, and the time unit #2 occupies the symbol 4 to the symbol 7. The time unit #3 occupies the symbol 9 to the symbol 12 (a dashed box in FIG. 8 represents a time unit). As shown in FIG. 8, symbols occupied by the span #1 to the span #3 are respectively located in the time unit #1 to the time unit #3. A part of symbols occupied by the span #4 are located in the time unit #1 and a part of symbols are located in the time unit #2 (partially overlapping with the time unit #1 and the time unit #2). A part of symbols occupied by the span #5 are located in the time unit #2 (partially overlapping with the time unit #2). Symbols occupied by the span #6 are located in the time unit #3.

S603: Allocate the first monitoring capability in the cell set based on the N time units, to separately monitor a PDCCH of each cell in the cell set.

Specifically, because the N time units are set, the first monitoring capability is allocated between the cells in the cell set by using the time unit as a unit. In other words, the first monitoring capability allocated to each cell in each time unit is considered. Further, the monitoring capability of each cell is embodied in a unit of a span in one slot. In other words, the first monitoring capability is finally allocated to a span of each cell in each time unit. Further, the terminal device monitors a candidate PDCCH of each cell in the cell set at a granularity of the span. Optionally, a value of $$M_{PDCCH}^{total,(X,Y),\mu}$$

calculated according to the foregoing formula (1) or a value of $$C_{PDCCH}^{total,(X,Y),\mu}$$

calculated according to the foregoing formula (2) may be used for allocation between spans in one of the N time units.

Optionally, the terminal device or the network device determines, based on a status of overlapping between a symbol occupied by the span of the cell in the cell set and one or more time units, how to participate in allocation of the first monitoring capability in each time unit.

In an implementation of this application, when symbols occupied by a first span of a first cell partially or completely overlap with a first time unit, a part or all of the first monitoring capability is allocated to the first cell based on a quantity of all symbols occupied by a span of the first cell. The first cell is a cell in the cell set. The first time unit is one of the N time units.

FIG. 8 is used as an example. When a monitoring capability is allocated to a span of each cell in the time unit #1, because the span #1 is completely located in the time unit #1, and a part of the span #4 is located in the time unit #1, a quantity of all symbols occupied by each of the span #1 and the span #4 is used to participate in allocation of the first monitoring capability in the time unit #1.

When a monitoring capability is allocated to a span of each cell in the time unit #2, because the span #2 is completely located in the time unit #2, the span #4 is partially located in the time unit #2, and the span #5 is partially located in the time unit #2, quantities of all symbols respectively occupied by the span #1, the span #2, and the span #3 participate in allocation of the first monitoring capability in the time unit #1.

The monitoring capability allocation between spans in a time unit is further described.

FIG. 8 is still used as an example. It is assumed that a PDCCH monitoring capability (using a maximum quantity of CCEs as an example) allocated to the cell set 1 is $$C_{PDCCH}^{total,cellset1,(4,3),\mu}=40,$$

that is, a maximum quantity of CCEs allocated to each time unit of the cell set 1 is 40. Further, a sum of maximum quantities of CCEs used for PDCCH monitoring on spans of different cells in each time unit of the cell set 1 is 40. Because a part of the span #4 is located in the time unit #1, in a possible implementation, the span #4 is completely counted into the time unit #1. Therefore, a sum of maximum quantities of CCEs corresponding to the span #1 and the span #4 is 40. Further, it is stipulated in the 3GPP protocol that a PDCCH overbooking scenario (PDCCH overbooking) appears only in a PCell. In the overbooking scenario, the terminal device may perform PDCCH dropping, so that a maximum monitoring times and a maximum quantity of CCEs that are used by the terminal device to monitor the PDCCH do not exceed a maximum upper limit respectively. In this application, the maximum upper limit is that one span pattern in one slot is maximum monitoring times and maximum quantity of CCEs corresponding to a span whose span pattern is (X, Y). It is assumed that a maximum quantity of CCEs corresponding to a span whose span pattern is (4, 3) is 36, and a sum of maximum quantities of CCEs used by a PCell and an SCell of a cell set 1 to monitor a PDCCH at a granularity of the span is 40. Because the terminal device needs to perform PDCCH dropping on the PCell, the network device first determines that the maximum quantity of the CCEs configured on one span of the span pattern (4, 3) in the PCell of the terminal device does not exceed 36. In other words, in the time unit #1, the maximum quantity of the CCEs configured on the span #1 does not exceed 36. A remaining part is 40−36=4. Therefore, a maximum quantity of CCEs configured by the network device for the span #4 in the time unit #1 in the SCell does not exceed 4. Optionally, if all cells of a cell set are SCells, because the terminal device does not need to perform PDCCH dropping, the network device only needs to set that a sum of maximum quantities of CCEs configured on the span #1 and the span #4 in the time unit #1 does not exceed 40. Maximum quantities of CCEs separately obtained by the span #1 and the span #4 may be randomly allocated by the network device.

In an implementation of this application, when symbols occupied by a span of the second cell partially or completely overlap with the second time unit, based on a proportion of a quantity of symbols of the overlapping part in a quantity of symbols occupied by the span of the second cell, a part or all of the first monitoring capability is allocated to the span of the second cell. The second cell is a cell in the cell set. The second time unit is one of the N time units.

FIG. 8 is used as an example. When a monitoring capability is allocated to a span of each cell in the time unit #1, the span #1 is completely located in the time unit #1, that is, a proportion of overlapping symbols between the span #1 and the time unit #1 is 100%. The span #4 overlaps two symbols with the time unit #1, a length of the span #4 is three symbols, and an overlapping proportion is ⅔. Therefore, the span #1 participates in allocation of the first monitoring capability in the time unit #1 by using 100% of a quantity of symbols occupied by the span #1. In addition, the span #4 participates in allocation of the first monitoring capability in the time unit #1 by using ⅔ of a quantity of symbols occupied by the span #4.

When a monitoring capability is allocated to a span of each cell in the time unit #2, the span #2 is completely located in the time unit #2. The span #4 overlaps one symbol with the time unit #1, a length of the span #4 is three symbols, and an overlapping proportion is ⅓. The span #5 and the time unit #2 overlap two symbols, a length of the span #5 is three symbols, and an overlapping proportion is ⅔. Therefore, the span #2 participates in allocation of the first monitoring capability in the time unit #2 by using 100% of a quantity of symbols occupied by the span #2. The span #4 participates in allocation of the first monitoring capability in the time unit #2 by using ⅓ of a quantity of symbols occupied by the span #4. The span #5 participates in allocation of the first monitoring capability in the time unit #2 by using ⅔ of a quantity of symbols occupied by the span #5.

Optionally, in an implementation of this application, when a symbol occupied by the span of the first cell overlaps two time units, the span of the first cell participates in allocation of the first monitoring capability only in one of the two time units.

FIG. 8 is used as an example. Optionally, if the span #4 participates in allocation of the first monitoring capability in the time unit #1 by using all symbols, the span #4 no longer participates in allocation of the first monitoring capability in the time unit #2. In other words, a span participates in allocation of the first monitoring capability in a previous time unit that overlaps the span. Optionally, if the span #4 participates in allocation of the first monitoring capability in the time unit #2 by using all symbols, the span #4 no longer participates in allocation of the first monitoring capability in the time unit #1. In other words, a span participates in allocation of the first monitoring capability in a next time unit that overlaps the span. Optionally, if the span #4 participates, at a proportion of overlapping symbols, in allocation of the first monitoring capability in the time unit that overlaps the span #4, because a quantity of overlapping symbols between the span #4 and the time unit #1 is 2, the quantity of overlapping symbols is greater than a quantity (1) of overlapping symbols between the span #4 and the time unit #2, the span #4 may participate in only allocation of the first monitoring capability in the time unit #1, and does not participate in allocation of the time unit #2. In other words, one span participates in monitoring capability allocation in a time unit in which a proportion of symbols overlapping with the span is the highest.

It may be understood that a span related to a time unit participates in monitoring capability allocation for each cell in a time unit, and the span related to the time unit includes at least one span whose symbol overlaps the time unit.

In an implementation of this application, when the foregoing method is performed by the terminal device, after the terminal device allocates the first monitoring capability in the cell set according to S601 to S603, the terminal device may monitor the PDCCH at a granularity of the span based on the monitoring capability of the span allocated to the cell. For example, in a self-scheduling scenario, the terminal device separately monitors, at a granularity of a span of each cell, a PDCCH sent in the cell. In a cross-carrier scheduling scenario, the terminal device monitors a PDCCH of the primary scheduling cell at a granularity of a span of the primary scheduling cell. The PDCCH of the primary scheduling cell may be used to schedule a data channel of the primary scheduling cell or a data channel of a scheduled cell. The PCell may be used as a primary scheduling cell of an SCell, or a SCell may be used as a primary scheduling cell of another SCell.

In an implementation of this application, when the foregoing method is performed by a network device such as the base station, after the base station allocates the first monitoring capability in the cell set according to S601 to S603, the base station may send PDCCH configuration information to a terminal device.

According to the PDCCH monitoring method provided in this application, one or more time units are set for a cell set including cells with a same subcarrier spacing and a same span pattern. Based on an overlapping relationship between the time unit and a time domain location of a span of each cell in the cell set, the monitoring capability corresponding to the cell set between the cells is allocated. Therefore, in a CA scenario, a problem that the monitoring capability corresponding to the span in each cell cannot be determined because spans of different cells are not aligned is resolved. Further, the terminal device can monitor a candidate PDCCH of each cell at a granularity of the span based on the monitoring capability of the span allocated to each cell.

Figures 9, 10:
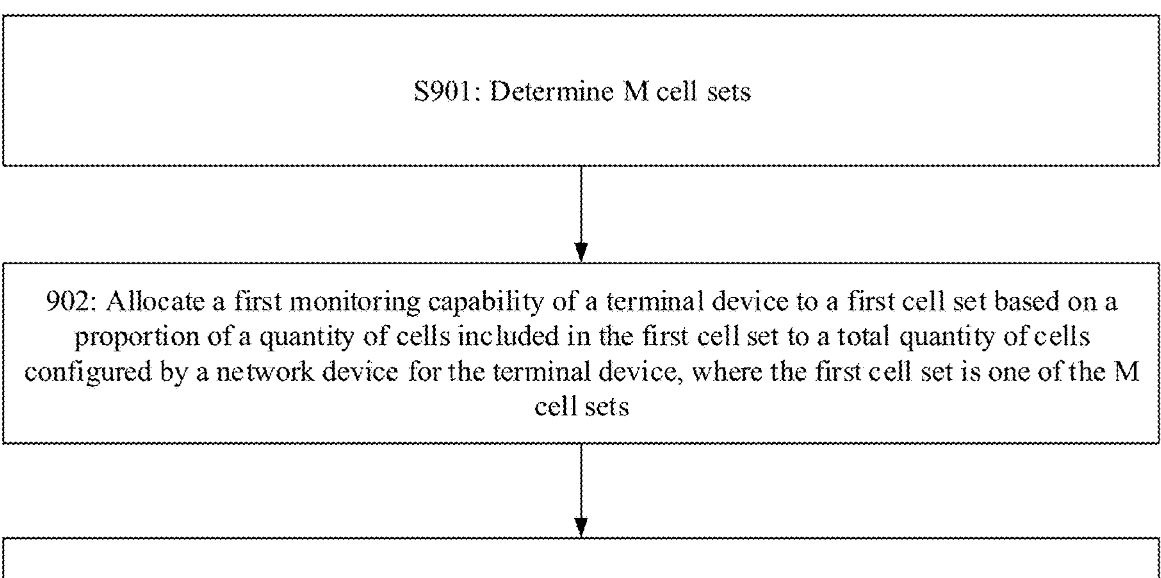
FIG. 9 is a schematic flowchart of another PDCCH monitoring method, according to an embodiment of this application.
FIG. 10 is a schematic diagram of a cell set, according to an embodiment of this application.

FIG. 9 is a schematic flowchart of a PDCCH monitoring method according to an embodiment of this application. The method provided in this application may be performed by a terminal device or a network device, or may be performed by a communication apparatus such as a chip used for the terminal device, or may be performed by a communication apparatus such as a chip used for the network device.

As shown in FIG. 9, the method includes the following steps.

S901: Determine M cell sets, where M is a positive integer, and each of the M cell sets includes at least one cell of a terminal device.

S902: Allocate a first monitoring capability of the terminal device to a first cell set based on a proportion of a quantity of cells included in the first cell set in a total quantity of cells configured by a network device for the terminal device, where the first cell set is one of the M cell sets.

The first cell set is one of the M cell sets.

Optionally, in an implementation of this application, the first cell set includes one cell of the terminal device Optionally, in an implementation of this application, the first cell set includes at least two cells of the terminal device. Each cell in the first cell set has a same span pattern (span pattern), an aligned span location, and a same subcarrier spacing. That is, for each cell set in the M cell sets, each cell included in the cell set has a same span pattern, an aligned span location, and a same subcarrier spacing.

Optionally, the cell set includes at least two SCells of the terminal device, or includes a PCell of the terminal device and at least one SCell of the terminal device.

For descriptions of the span pattern and the subcarrier spacing, refer to the foregoing related content. Details are not described herein again.

Optionally, that each cell in the first cell set has an aligned span location includes: When a second span overlaps a first span, a start symbol of the first span is the same as a start symbol of the second span, and a quantity of symbols occupied by the first span is the same as a quantity of symbols occupied by the second span. The first span is a span in a first cell, and the second span is a span in a second cell. The first cell and the second cell belong to the first cell set. Specifically, the first span may be any span in the first cell. The second span may be any span in the second cell. The first cell and the second cell may be any two cells that are configured by a network side for the terminal device and that have a same span pattern and a same subcarrier spacing. In this implementation, a requirement for span location alignment is that a plurality of spans that separately belong to a plurality of cells and whose time domain locations overlap have same start symbols. In other words, indexes of the start symbols are the same, and lengths of the spans are the same. If start symbols of spans of two cells are different, it cannot be considered that span locations of the two cells are aligned. In this application, the foregoing described case in which the span location of each cell in the first cell set is aligned may be referred to as a scenario in which the spans of the first cell set are completely aligned. As shown in FIG. 10, a cell set includes a PCell and an SCell, span patterns are both (4, 3). A span #1, a span #2, and a span #3 are configured for the PCell in one slot. A span #4, a span #5, and a span #6 are configured for the SCell in one slot. Lengths of the span #1 to the span #6 are all three symbols. Start symbols of the span #1 and the span #4 are the same. Start symbols of the span #2 and the span #5 are the same. Start symbols of the span #3 and the span #6 are the same. Therefore, it may be considered that span locations of the PCell and the SCell are aligned.

Optionally, in an implementation of this application, the method further includes: determining N time units that are of the first cell set and that do not overlap with each other in one slot, where N is a positive integer. A meaning of the time unit is the same as that of the time unit in the embodiments described in FIG. 6 to FIG. 8. For how to determine the time unit, refer to the foregoing related content, for example, related descriptions in S602. Details are not described herein again.

In this implementation, whether start symbols of spans of cells in the cell set are the same is not limited.

In this implementation, that each cell in the first cell set has an aligned span location specifically includes: A third span partially or completely overlaps a first time unit, and does not overlap another time unit in the N time units other than the first time unit. The third span is a span is in the first cell set. The first time unit is one of the N time units. In other words, any span in the first cell set is completely located in one of the N time units. Alternatively, a part of the span is located in a time unit, and a remaining part is located outside the time unit and is not located in another time unit. In other words, a span does not cross the boundary of two time units. That a span is partially or completely located in a time unit means that symbols occupied by the span may be partially or completely located in the time unit. In other words, symbols occupied by the span may partially or completely overlap symbols occupied by the time unit. In this application, the foregoing case in which span location of each cell in the first cell set is aligned may be referred to as a scenario in which spans in the first cell set are aligned based on time units.

Optionally, the foregoing two manners of determining that span locations are aligned may be used in combination. For example, start symbols of first spans of the first cell and the second cell in a same slot are the same and have a same length, and start symbols of other spans after the first span are different but are located in a same time unit. It may also be considered that span locations of these cells are aligned.

Optionally, in an implementation of this application, some or all of the M cell sets may include only one cell. The cell may be a PCell or an SCell of the terminal device.

Figure 11:
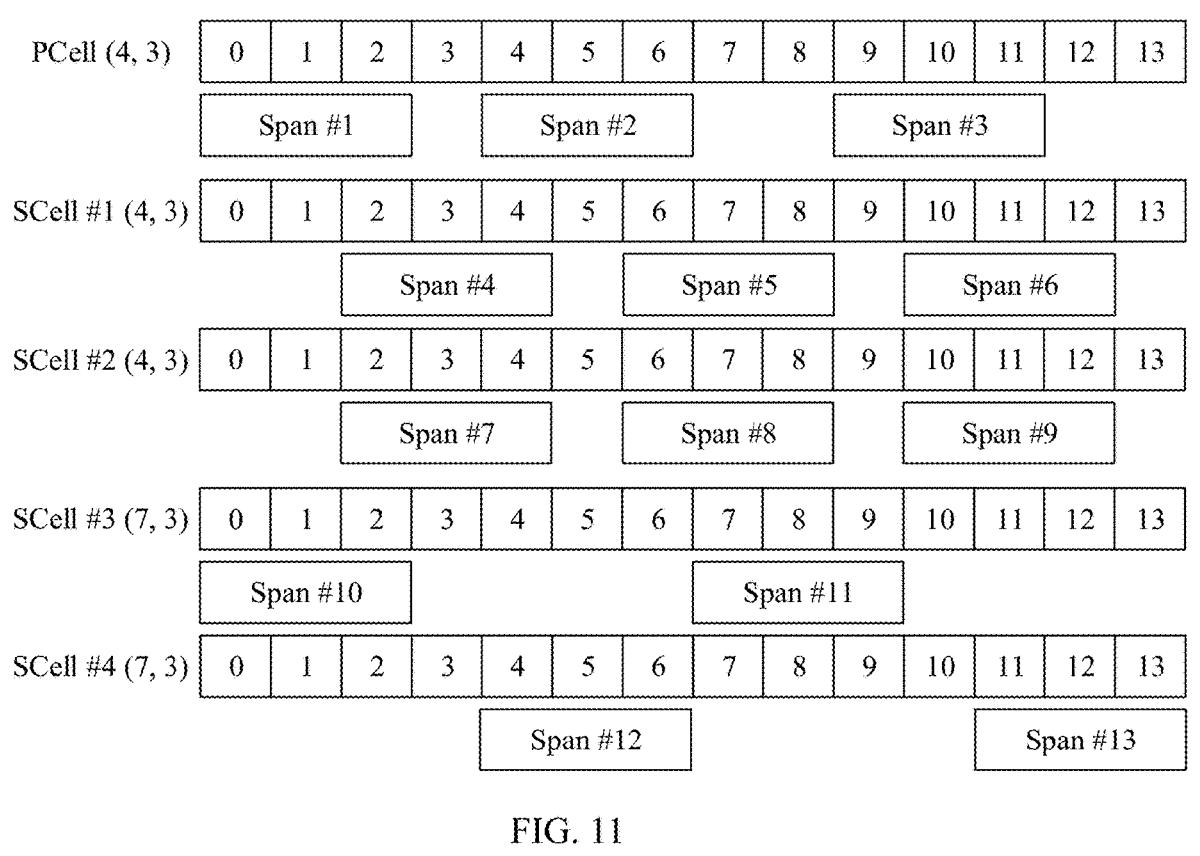

Refer to FIG. 11, a manner of determining the foregoing M cell sets is described. It is assumed that the network device configures five cells for the terminal device, one of the cells is used as a PCell of the terminal device, and remaining cells are used as an SCell #1 to an SCell #4 of the terminal device. Subcarrier spacings of the PCell, the SCell #1, the SCell #2, the SCell #3, and the SCell #4 are all 15 kHz. Span patterns of the PCell, the SCell #1, and the SCell #2 are (4, 3). Span patterns of the SCell #3 and the SCell #4 are (7, 3). The PCell has a span #1, a span #2, and a span #3 in the slot 1. The SCell #1 has a span #4, a span #5, and a span #6 in a slot 1. The SCell #2 has a span #7, a span #8, and a span #9 in the slot 1. The SCell #3 has a span #10 and a span #11 in the slot 1. The SCell #4 has a span #12 and a span #13 in the slot 1. The slot 1 includes 14 symbols (a symbol 0 to a symbol 13) whose index numbers are 0 to 13. For the PCell, a start symbol location of the span #1 is the symbol 0, and the span #1 occupies the symbol 0 to the symbol 2. A spacing between a start symbol location of the span #2 and a start symbol location of the span #1 is four symbols. The span #2 occupies the symbol 4 to the symbol 6. A spacing between a start symbol location of the span #3 and a start symbol location of the span #2 is five symbols. The span #3 occupies the symbol 9 to the symbol 11. For the SCell #1, a start symbol location of the span #4 is the symbol 2, and the span #4 occupies the symbol 2 to the symbol 4. A spacing between the start symbol locations of the span #5 and the span #4 is four symbols. The span #5 occupies the symbol 6 to the symbol 8. A spacing between start symbol locations of the span #6 and the span #5 is four symbols. The span #6 occupies the symbol 10 to the symbol 12. For the SCell #2, a start symbol location of the span #7 is the symbol 2, and the span #7 occupies the symbol 2 to the symbol 4. A spacing between the start symbol locations of the span #8 and the span #7 is four symbols. The span #8 occupies the symbol 6 to the symbol 8. A spacing between start symbol locations of the span #9 and the span #8 is four symbols. The span #9 occupies the symbol 10 to the symbol 12. For the SCell #3, a start symbol location of the span #10 is the symbol 0, and the span #10 occupies the symbol 0 to the symbol 2. A spacing between the start symbol locations of the span #11 and the span #10 is seven symbols. The span #11 occupies the symbol 7 to the symbol 9. For the SCell #4, a start symbol location of the span #12 is the symbol 4, and the span #12 occupies the symbol 4 to the symbol 6. A spacing between the start symbol locations of the span #13 and the span #12 is seven symbols. The span #13 occupies the symbol 11 to the symbol 13. As shown in FIG. 11, subcarrier spacing configurations and span patterns of the PCell, the SCell #1, and the SCell #2 are the same, but spans are not aligned. The PCell is separately allocated to a cell set (cell set 1). The SCell #1 and the SCell #2 have a same subcarrier spacing and a same span pattern, and spans are aligned. Therefore, the SCell #1 and the SCell #2 may be divided into a cell set (cell set 2). Although the PCell, the SCell #3, and the SCell #4 have a same subcarrier spacing and a same span pattern, spans are not aligned. Therefore, they are independent cell sets (cell set 3 to cell set 4).

Figure 12:
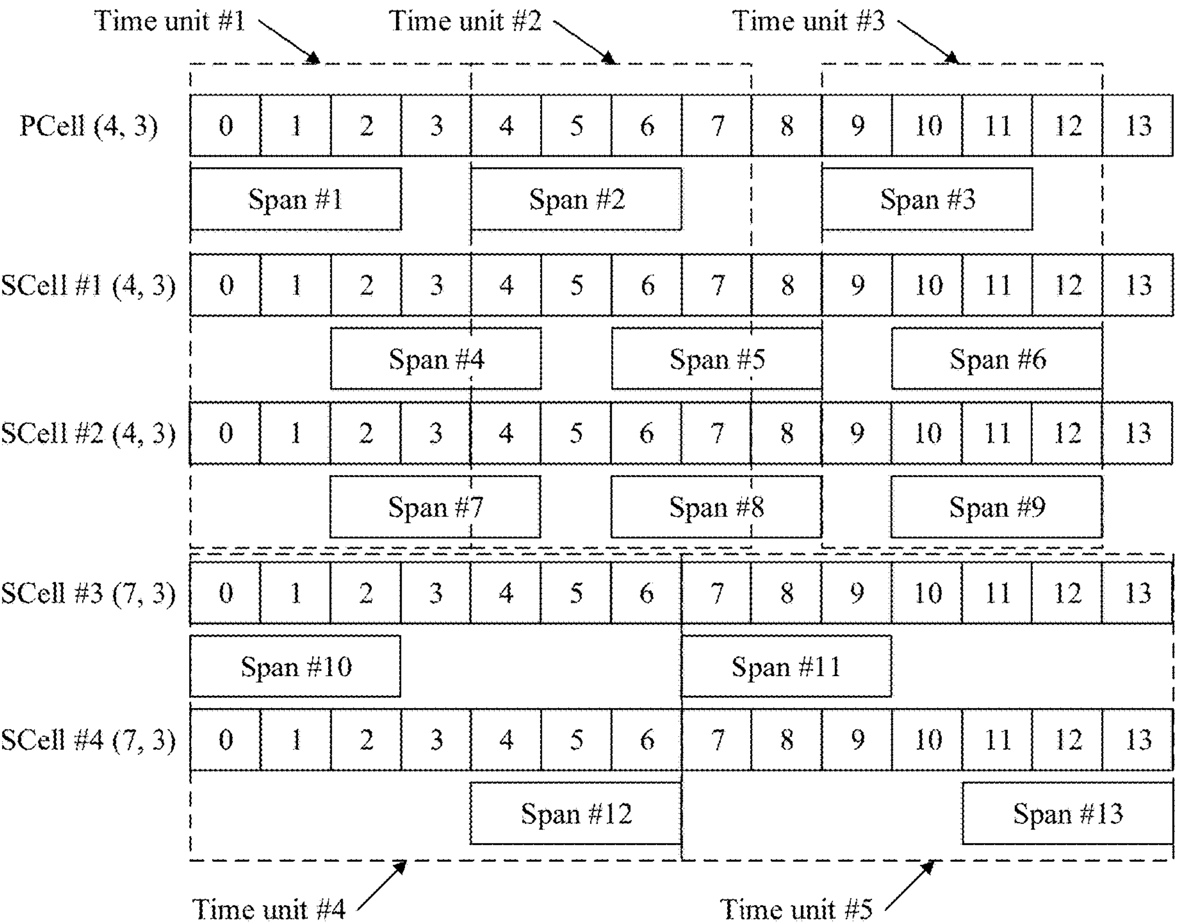
FIG. 12 is a schematic diagram of still another cell set, according to an embodiment of this application.

Optionally, it is considered that the time unit is used as a basis for determining the cell set. Because the span patterns and the subcarrier spacings of the PCell, the SCell #1, and the SCell #2 are the same, a time unit may be first determined based on the spans of the PCell, the SCell #1, and the SCell #2. As shown in FIG. 12, a time unit #1 to a time unit #3 are included, and a length of each time unit is four symbols (one dashed box in FIG. 12 represents one time unit). A part of symbols of the span #4 and the span #7 are located in the time unit #1. A part of symbols of the span #5 and the span #8 are located in the time unit #2. A part of symbols of the span #6 and the span #9 are located in the time unit #3. Therefore, the PCell may be used, and the SCell #1 and the SCell #2 are grouped into a cell set (cell set 1'). A length of the time unit #4 and a length of the time unit #5 are seven symbols. Because all symbols of the span #10 and the span #12 are located in the time unit #4, and all symbols of the span #11 and the span #13 are located in the time unit #5, the SCell #3 and the SCell #4 are grouped into a cell set (cell set 2').

The maximum quantity of cells supported by PDCCH monitoring performed by the terminal device is a maximum total quantity of cells of all subcarrier spacings supported by PDCCH monitoring performed by the terminal device under a CA condition. In addition, the total quantity of cells is not dependent on subcarrier spacing configurations of different cells, that is, includes a total quantity of cells with different subcarrier spacings configured by the network device.

Optionally, the first monitoring capability includes the maximum monitoring times and/or the maximum quantity of CCEs. Refer to the foregoing related descriptions. Details are not described herein again.

Optionally, in an implementation of this application, the first monitoring capability of the terminal device is determined based on a maximum quantity of cells supported by PDCCH monitoring performed by the terminal device and the monitoring capability corresponding to the span pattern of the first cell set.

Optionally, in an implementation of this application, the maximum monitoring times allocated to the first cell set may be calculated according to the following formula (3):

$$M_{PDCCH}^{total,cellseti,(X,Y),\mu} = \left\lfloor N_{cells}^{cap} \cdot M_{PDCCH}^{max,(X,Y),\mu} \cdot \left(N_{cell}^{DL,cellseti,(X,Y),\mu}\right) / \sum\nolimits_{j=0}^{1} \left(N_{cell}^{DL,j}\right) \right\rfloor \quad (3)$$

$$M_{PDCCH}^{total,cellseti,(X,Y),\mu}$$

represents the maximum quantity of times that the terminal device monitors the PDCCH in the first cell set. A subcarrier spacing of each cell in the first cell set is configured as A span pattern is (X, Y). A value of μ is 0 or 1. A value of (X, Y) is one of a set {(2, 2), (4, 3), (7, 3)}. The first cell set is represented by a cell set i, i is an index of the first cell set in the M cell sets, and i is a nonnegative integer less than or equal to M.

$$N_{cells}^{cap}$$

represents a maximum quantity of cells supported by monitoring the PDCCH by the terminal device.

$$M_{PDCCH}^{max,(X,Y),\mu}$$

represents a maximum quantity of times that the terminal device monitors the PDCCH in a span of a cell whose subcarrier spacing is μ and span pattern is (X, Y).

$$N_{cell}^{DL,cellseti,(X,Y),\mu}$$

represents a quantity of cells whose subcarrier spacing is span pattern is (X, Y), and span locations are aligned configured by the network device for the terminal device, that is, represents a quantity of cells in the first cell set or the cell set i.

$$\sum\nolimits_{j=0}^{1} \left(N_{cell}^{DL,j}\right)$$

represents a total quantity of cells configured by the network device for the terminal device. j represents a subcarrier spacing configuration, and a value of j is 0 or 1.

Optionally, i may be counted starting from 0, or may be counted starting from 1.

Optionally, in an implementation of this application, the maximum quantity of CCEs allocated to the first cell set may be calculated according to the following formula (4):

$$C_{PDCCH}^{total,cellseti,(X,Y),\mu} = \left\lfloor N_{cells}^{cap} \cdot C_{PDCCH}^{max,(X,Y),\mu} \cdot \left(N_{cell}^{DL,cellseti,(X,Y),\mu}\right) / \sum\nolimits_{j=0}^{1} \left(N_{cell}^{DL,j}\right) \right\rfloor \quad (4)$$

$$C_{PDCCH}^{total,cellseti,(X,Y),\mu}$$

represents a maximum quantity of CCEs used by the terminal device to monitor the PDCCH in the first cell set.

$$C_{PDCCH}^{max(X,Y),\mu}$$

represents a maximum quantity of CCEs used by the terminal device to monitor the PDCCH in the span of the cell whose subcarrier spacing configuration is μ and span pattern is (X, Y). Variables with a same name in formula (4) and formula (3) have a same physical meaning, and details are not described again.

It may be understood that, because the terminal device monitors the PDCCH at a granularity of a span, in a scenario in which spans in the first cell set are completely aligned, the monitoring capability allocated to the first cell set may be a sum of monitoring capabilities of all cells in the first cell set within a time domain range of one span. In a scenario in which the spans in the first cell set are aligned based on time units, the monitoring capability allocated to the first cell set may be the sum of the monitoring capabilities of all cells in the first cell set within a time domain range of a time unit. For example, the foregoing $$M_{PDCCH}^{total,cellseti,(X,Y),\mu}$$

refers to a sum of maximum quantities of times that the terminal device monitors candidate PDCCHs of all cells in the first cell set within a time domain range of a span or a time unit. For another example, the foregoing $$C_{PDCCH}^{total,cellseti,(X,Y),\mu}$$

refers to a sum of maximum quantities of CCEs used by the terminal device to monitor candidate PDCCHs of all cells in the first cell set within a time domain range of a span or a time unit.

S903: Allocate, between the cells in the first cell set, a monitoring capability allocated to the first cell set, to separately monitor a PDCCH of each cell in the first cell set.

Optionally, the allocating, between cells in the first cell set, a monitoring capability allocated to the first cell set meets the following condition: a sum of maximum monitoring times allocated to all cells is less than or equal to the maximum monitoring times allocated to the first cell set; and a sum of the maximum quantity of CCEs allocated to the cells is less than or equal to the maximum quantity of CCEs allocated to the first cell set.

Optionally, when a time unit is used as a basis for determining a cell set, and a monitoring capability allocated to the cell set is allocated between cells in the cell set, overlapping between a span and a time unit of each cell may be considered, and the monitoring capability is allocated between cells by using an overlapping proportion between the span and the time unit. For a specific implementation, refer to related content in the embodiments shown in FIG. 6 to FIG. 8, for example, the description in S603. Details are not described herein again.

Optionally, the allocating, between cells in the first cell set, a monitoring capability allocated to the first cell set includes: when the first cell set includes a PCell and an SCell, preferentially allocating the monitoring capability to the PCell. Similarly, when the SCell includes the PSCell, a priority of allocating the monitoring capability to the PSCell is higher than that of another SCell.

Figure 13:
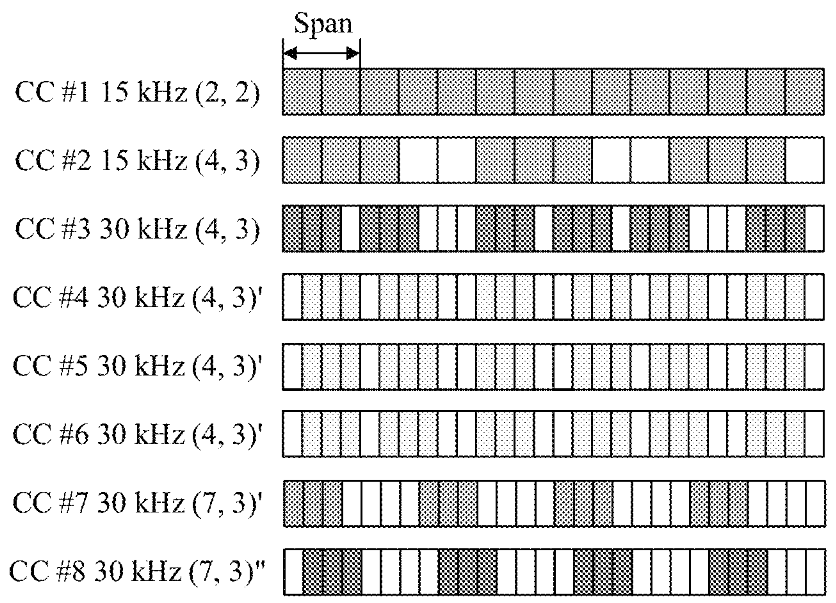
FIG. 13 is a schematic diagram of yet another cell set, according to an embodiment of this application.

Refer to FIG. 13, a process of calculating the monitoring capability of the cell set is described.

It is assumed that a network side configures eight cells for a terminal device (in FIG. 13, CC #1 to CC #8 are used to represent the eight cells). Cells with a subcarrier spacing of 15 kHz are a CC #1 and a CC #2, and cells with a subcarrier spacing of 30 kHz are a CC #3, a CC #4, a CC #5, a CC #6, a CC #7, and a CC #8. A span pattern of the CC #1 is (2, 2), span patterns of the CC #2 to the CC #6 are (4, 3), and span patterns of the CC #7 and the CC #8 are (7, 3). Each of the CC #1, the CC #2, the CC #3, the CC #7, and the CC #8 is a cell set, and the CC #4, the CC #5, and the CC #6 are grouped into a cell set. For a method for determining the cell set, refer to the foregoing content. Details are not described again. Superscripts of (X, Y) in FIG. 13 indicate whether patterns are the same. For example, (4, 3)' and (4, 3)' have same subcarrier spacing configurations, same span patterns, and spans of cells are aligned. (7,3)' and (7,3)' have same subcarrier spacing configurations, same span patterns, but spans of cells are not aligned. It is assumed that a relationship between a serving cell whose span pattern is (X, Y) and subcarrier spacing is a maximum monitoring times for the terminal device to monitor the alternative PDCCH, and a maximum quantity of used CCEs is shown in Table 1 to Table 2.

TABLE 1

| μ | maximum quantity of monitoring times $M_{PDCCH}^{max,\ (X,\ Y),\ \mu}$ corresponding to a serving cell whose span pattern is (X, Y) | | |
|---|---|---|---|
| | (2, 2) | (4, 3) | (7, 3) |
| 0 | 8 | 18 | 28 |
| 1 | 8 | 18 | 28 |

TABLE 2

| μ | maximum quantity of CCEs $C_{PDCCH}^{max,\ (X,\ Y),\ \mu}$ corresponding to a serving cell whose span pattern is (X, Y) | | |
|---|---|---|---|
| | (2, 2) | (4, 3) | (7, 3) |
| 0 | 28 | 36 | 56 |
| 1 | 28 | 36 | 56 |

It is assumed that a PDCCH monitoring capability supported by the terminal device in a CA scenario is four cells. The following uses the maximum quantity of CCEs as an example:

for a cell set 1, that is, CC #1, $$C_{PDCCH}^{total,set\,1,(2,2),\mu=0} = \left\lfloor \frac{N_{cells}^{cap} \cdot C_{PDCCH}^{max,\,(2,2),\mu=0} \cdot \left(N_{cell}^{DL,\,set\,1,(2,2),\mu=0}\right)}{\sum_{j=0}^{1}\left(N_{cell}^{DL,\,j}\right)} \right\rfloor = \left\lfloor \frac{6\times 28\times 1}{8} \right\rfloor = 21$$

for a cell set 2, that is, *CC* #2, $$C_{PDCCH}^{total,\,set\,2,(4,3),\mu=0} = \left\lfloor \frac{N_{cells}^{cap} \cdot C_{PDCCH}^{max,\,(4,3),\mu=0} \cdot \left(N_{cell}^{DL,\ set\,2,(4,3),\mu=0}\right)}{\sum_{j=0}^{1}\left(N_{cell}^{DL,\,j}\right)} \right\rfloor = \left\lfloor \frac{6\times 36\times 1}{8} \right\rfloor = 27$$

for a cell set 3, that is, *CC* #3, $$C_{PDCCH}^{total,\,set\,3,(4,3),\mu=0} = \left\lfloor \frac{N_{cells}^{cap} \cdot C_{PDCCH}^{max,\,(4,3),\mu=1} \cdot \left(N_{cell}^{DL,\ set\,3,(4,3),\mu=1}\right)}{\sum_{j=0}^{1}\left(N_{cell}^{DL,\,j}\right)} \right\rfloor = \left\lfloor \frac{6\times 36\times 1}{8} \right\rfloor = 27$$

for a cell set 4, that is, CC #4, CC #5, and CC #6, $$C_{PDCCH}^{total,set\,4,(4,3),\mu=0} = \left\lfloor \frac{N_{cells}^{cap} \cdot C_{PDCCH}^{max,(4,3),\mu=1} \cdot \left(N_{cell}^{DL,\,set\,4,(4,3),\mu=1}\right)}{\sum_{j=0}^{1}\left(N_{cell}^{DL,\,j}\right)} \right\rfloor = \left\lfloor \frac{6\times36\times3}{8} \right\rfloor = 81$$

for a cell set 5, that is, *CC* #7, $$C_{PDCCH}^{total,\,set\,5,(7,3),\mu=0} = \left\lfloor \frac{N_{cells}^{cap} \cdot C_{PDCCH}^{max,(7,3),\mu=1} \cdot \left(N_{cell}^{DL,\,set\,5,(7,3),\mu=1}\right)}{\sum_{j=0}^{1}\left(N_{cell}^{DL,\,j}\right)} \right\rfloor = \left\lfloor \frac{6\times56\times1}{8} \right\rfloor = 42$$

for a cell set 6, that is, *CC* #8, $$C_{PDCCH}^{total,\,set\,5,(7,3),\mu=0} = \left\lfloor \frac{N_{cells}^{cap} \cdot C_{PDCCH}^{max,(7,3),\mu=1} \cdot \left(N_{cell}^{DL,\,set\,5,(7,3),\mu=1}\right)}{\sum_{j=0}^{1}\left(N_{cell}^{DL,\,j}\right)} \right\rfloor = \left\lfloor \frac{6\times56\times1}{8} \right\rfloor = 42$$

Calculation of the maximum quantity of monitoring times is similar and is not described here.

It may be understood that the calculation formulas provided in embodiments of this application are merely examples, and do not constitute a limitation on embodiments of this application. For example, the calculation formulas may have a plurality of variation manners, and names of variables used in the calculation formulas may also be replaced.

According to the PDCCH monitoring method provided in embodiments of this application, cells with a same subcarrier spacing, a same span pattern, and aligned span locations are grouped into a cell set. The monitoring capability of the terminal device is allocated to the cell set based on a proportion of a quantity of cells included in the cell set in a total quantity of cells configured by the network device for the terminal device. The monitoring capability is allocated between cells in the cell set. Cells with unaligned spans are grouped into different cell sets for differentiation, and then a capability of monitoring a PDCCH is allocated between cell sets through calculation according to a formula or through a mapping relationship. This resolves a problem in a CA scenario, because spans of different cells are not aligned, a monitoring capability corresponding to a span of each cell cannot be determined. Further, the terminal device may monitor a candidate PDCCH of each cell in the cell set at a granularity of a span based on the monitoring capability of the span allocated to each cell.

Figure 14:
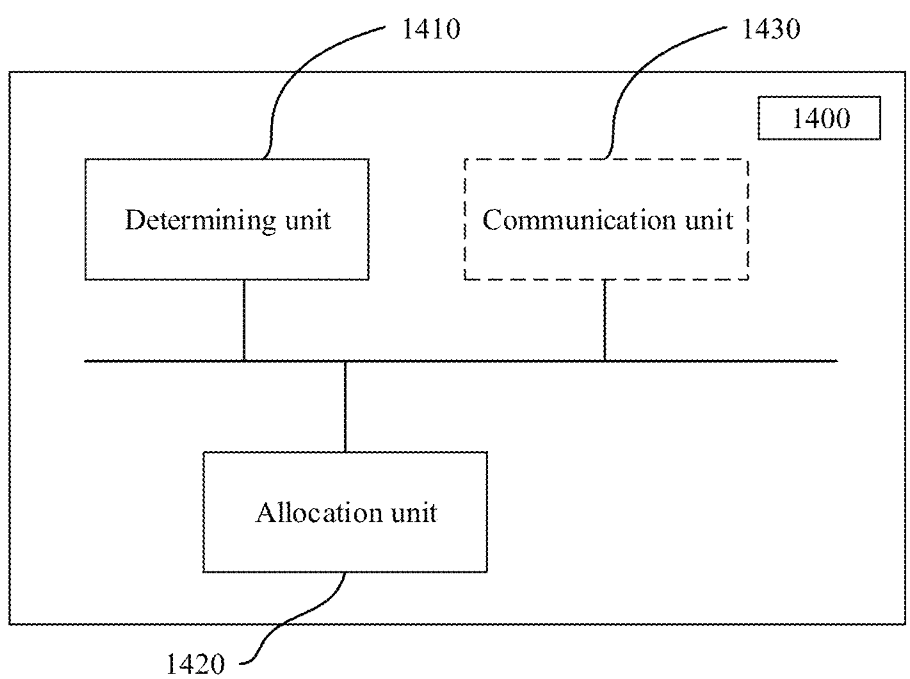
FIG. 14 is a schematic diagram of a structure of a communication apparatus, according to an embodiment of this application.

An embodiment of this application further provides a communication apparatus configured to implement any one of the foregoing methods. For example, a communication apparatus is provided, including units (or means) configured to implement steps performed by the terminal device or the network device in any one of the foregoing methods. For example, FIG. 14 is a schematic diagram of a communication apparatus according to an embodiment of this application. The communication apparatus may be a module, for example, a chip, used for a terminal device or a network device. Alternatively, the communication apparatus is a terminal device or a network device. As shown in FIG. 14, the communication apparatus 1400 includes a determining unit 1410 and an allocation unit 1420.

Optionally, in an implementation, the determining unit 1410 may be configured to: determine that a first monitoring capability of a terminal device is used to monitor a PDCCH of a cell set of the terminal device, where the cell set includes at least two SCells of the terminal device, or includes a PCell of the terminal device and at least one SCell of the terminal device, and each cell in the cell set has a same span pattern and a same subcarrier spacing; and determine N time units of the cell set in one slot, where a start location of each of the N time units is based on a span of a cell in the cell set, and N is a positive integer. The allocation unit 1420 may be configured to allocating the first monitoring capability in the cell set based on the N time units, to separately monitor a PDCCH of each cell in the cell set.

For more detailed descriptions of the determining unit 1410 and the allocation unit 1420 in this implementation, directly refer to related descriptions in the method embodiments shown in FIG. 6 to FIG. 7. Details are not described herein again.

Optionally, in an implementation, the determining unit 1410 may be configured to determine M cell sets, where M is a positive integer, and each of the M cell sets includes at least one cell of a terminal device. The allocation unit 1420 is configured to allocate a first monitoring capability of the terminal device to the first cell set based on a proportion of a quantity of cells included in a first cell set in a total quantity of cells configured by a network device for the terminal device, and allocate, between cells in the first cell set, a monitoring capability allocated to the first cell set, to separately monitor a PDCCH of each cell in the first cell set. The first cell set is one of the M cell sets. The first cell set includes one cell of the terminal device. Alternatively, the first cell set includes at least two cells of the terminal device. Each cell in the first cell set has a same span pattern (span pattern), an aligned span location, and a same subcarrier spacing. The at least two cells of the terminal device include at least two SCells of the terminal device, or include a PCell and at least one SCell of the terminal device.

For more detailed descriptions of the determining unit 1410 and the allocation unit 1420 in this implementation, directly refer to related descriptions in the method embodiments shown in FIG. 8 to FIG. 11. Details are not described herein again.

Optionally, the communication apparatus 1400 further includes a communication unit 1430, configured to communicate with another device. For example, when the communication apparatus 1400 is a terminal device or is used in a terminal device, the communication unit 1703 is configured to communicate with a network device such as a base station. When the communication apparatus 1400 is a network device such as a base station or is used in a network device, the communication unit 1703 is configured to communicate with a terminal device.

It should be understood that division into the units in the apparatus is merely logical function division. During actual implementation, all or some of the units may be integrated into one physical entity or may be physically separated. In addition, all the units in the apparatus may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. In addition, each unit may alternatively be stored in a memory in a form of a program to be invoked by a processing element of the apparatus to perform a function of the unit. In addition, all or some of the units may be integrated, or may be implemented independently. The processing element herein may also be referred to as a processor, and may be an integrated circuit having a signal processing capability. During implementation, steps in the foregoing methods or the foregoing units may be implemented by using a hardware integrated logic circuit in a processor element, or may be implemented in the form of software invoked by the processing element.

For example, a unit in any one of the foregoing apparatuses may be one or more integrated circuits configured to implement the foregoing method, for example, one or more application-specific integrated circuits (Application-Specific Integrated Circuits, ASICs), one or more microprocessors, digital signal processors (digital signal processors, DSPs), one or more field programmable gate arrays (Field Programmable Gate Arrays, FPGAs), or a combination of at least two of the integrated circuits. For another example, when the units in the apparatus may be implemented in a form in which a processing element invokes a program, the processing element may be a general-purpose processor, for example, a central processing unit (Central Processing Unit, CPU) or another processor that can invoke the program. For still another example, the units may be integrated and implemented in a form of a system-on-a-chip (system-on-a-chip, SOC).

The foregoing unit (for example, the communication unit) for receiving is an interface circuit of the apparatus, and is configured to receive a signal from another apparatus. For example, when the apparatus is implemented by a chip, the receiving unit is an interface circuit that is of the chip and that is configured to receive a signal from another chip or apparatus. The foregoing unit (for example, the sending unit or the communication unit) for sending is an interface circuit of the apparatus, and is configured to send a signal to another apparatus. For example, when the apparatus is implemented by a chip, the sending unit is an interface circuit that is of the chip and that is configured to send a signal to another chip or apparatus.

Figure 15:
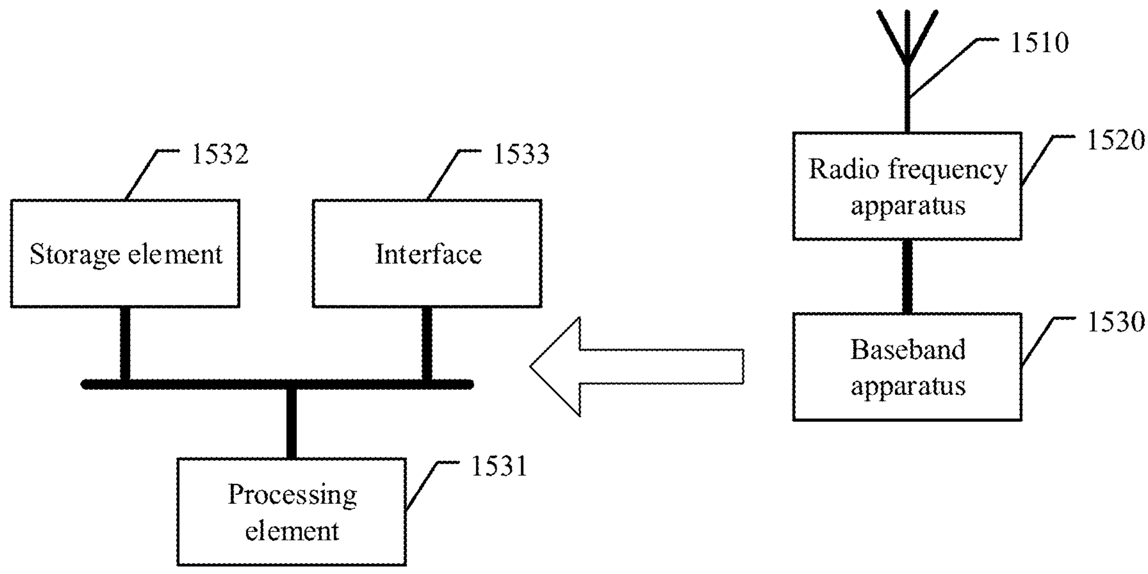
FIG. 15 is a schematic diagram of a structure of a network device, according to an embodiment of this application.

FIG. 15 is a schematic diagram of a structure of a network device according to an embodiment of this application. The network device may be a base station, and is configured to perform the PDCCH monitoring method provided in the foregoing method embodiments. As shown in FIG. 15, the network device includes an antenna 1510, a radio frequency apparatus 1520, and a baseband apparatus 1530. The antenna 1510 is connected to the radio frequency apparatus 1520. In an uplink direction, the radio frequency apparatus 1520 receives, through the antenna 1510, information sent by a terminal device, and sends, to the baseband apparatus 1530 to process, the information sent by the terminal device. In a downlink direction, the baseband apparatus 1530 processes information from the terminal device and sends processed information to the radio frequency apparatus 1520, and the radio frequency apparatus 1520 processes the information from the terminal device and then sends processed information to the terminal device by using the antenna 1510.

The baseband apparatus 1530 may include one or more processing elements 1531, for example, include a main control CPU and another integrated circuit. In addition, the baseband apparatus 1530 may further include a storage element 1532 and an interface circuit 1533. The storage element 1532 is configured to store a program and data. The interface circuit 1533 is configured to exchange information with the radio frequency apparatus 1520, and the interface is, for example, a common public radio interface (CPRI). The foregoing apparatus used in the network device may be located in the baseband apparatus 1530. For example, the foregoing apparatus used in the network device may be a chip in the baseband apparatus 1530. The chip includes at least one processing element and an interface circuit. The processing element is configured to perform the steps of any PDCCH monitoring method provided in the foregoing method embodiments. The interface circuit is configured to communicate with another apparatus. In an implementation, units in the network device for implementing the steps in the foregoing methods may be implemented in a form of scheduling a program by the processing element. For example, the apparatus used for the network device includes a processing element and a storage element. The processing element invokes a program stored in the storage element, to perform the PDCCH monitoring method provided in the foregoing method embodiments. The storage element may be a storage element on the same chip as the processing element, that is, an on-chip storage element; or may be a storage element that is on a different chip from the processing element, that is, an off-chip storage element.

Figure 16:
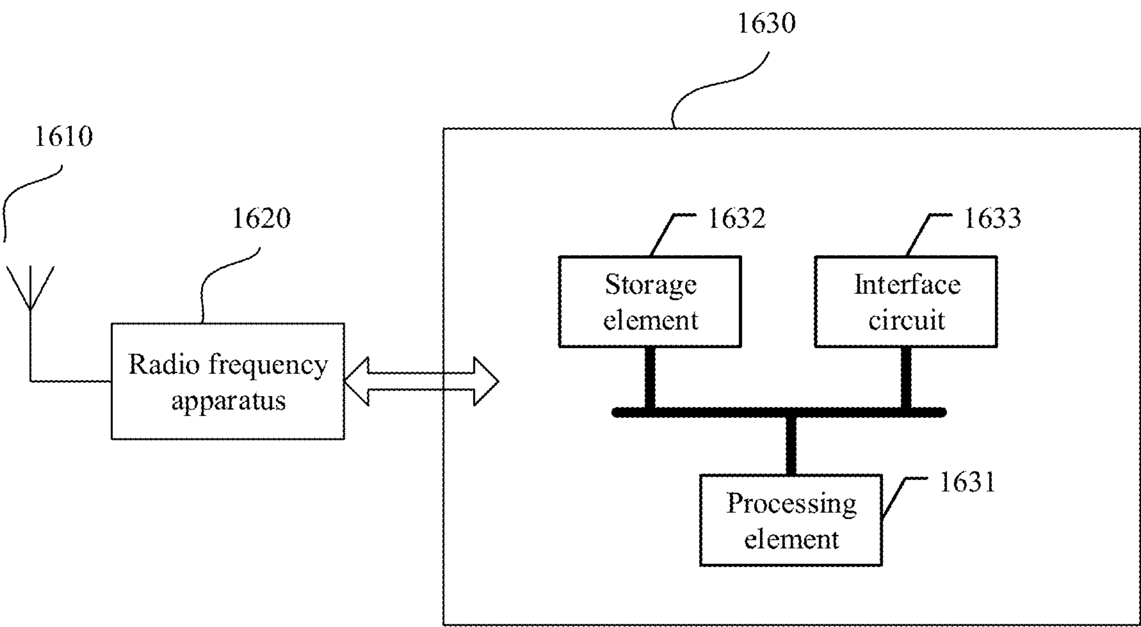
FIG. 16 is a schematic structural diagram of a terminal device, according to an embodiment of this application.

FIG. 16 is a schematic diagram of a structure of a terminal device according to an embodiment of this application. The terminal device is configured to implement the PDCCH monitoring method provided in the foregoing method embodiments. As shown in FIG. 16, the terminal device includes an antenna 1610, a radio frequency part 1620, and a signal processing part 1630. The antenna 1610 is connected to the radio frequency part 1620. In a downlink direction, the radio frequency part 1620 receives, through the antenna 1610, information sent by a network device, and sends, to the signal processing part 1630 for processing, the information sent by the network device. In an uplink direction, the signal processing part 1630 processes information of the terminal device, and sends the information to the radio frequency part 1620. The radio frequency part 1620 processes the information of the terminal device, and then sends the processed information to the network device through the antenna 1610.

The signal processing part 1630 is configured to process each communication protocol layer of data. The signal processing part 1630 may be a subsystem of the terminal device. The terminal device may further include another subsystem, for example, a central processing subsystem, configured to process an operating system and an application layer of the terminal device; and for another example, a peripheral subsystem, configured to connect to another device. The signal processing part 1630 may be a separately disposed chip. Optionally, the foregoing apparatus may be located in the signal processing part 1630.

The signal processing section 1630 may include one or more processing elements 1631, for example, include a main control CPU and another integrated circuit. In addition, the signal processing part 1630 may further include a storage element 1632 and an interface circuit 1633. The storage element 1632 is configured to store data and a program. The program used to perform the method performed by the terminal device in the foregoing method may be stored or may not be stored in the storage element 1632, for example, stored in a memory outside the signal processing part 1630. When used, the signal processing part 1630 loads the program to a cache for use. The interface circuit 1633 is configured to communicate with the apparatus. The foregoing apparatus may be located in the signal processing part 1630. The signal processing part 1630 may be implemented by a chip. The chip includes at least one processing element and an interface circuit. The processing element is configured to perform the steps of any PDCCH monitoring method provided in the foregoing method embodiments. The interface circuit is configured to communicate with another apparatus. In an implementation, units that implement the steps in the foregoing methods may be implemented in a form of a program invoked by a processing element. For example, the apparatus includes a processing element and a storage element. The processing element invokes a program stored in the storage element, to perform any PDCCH monitoring method provided in the foregoing method embodiments. The storage element may be a storage element located on a same chip as the processing element, namely, an on-chip storage element.

In another implementation, a program used to perform the foregoing method performed by the terminal device or the network device may be in a storage element located on a chip different from that of the processing element, namely, an off-chip storage element. In this case, the processing element invokes or loads a program from the off-chip storage element to an on-chip storage element, to invoke and perform any PDCCH monitoring method in the foregoing method embodiments.

In still another implementation, a unit used by the terminal device or the network device to implement the steps in the foregoing method may be configured as one or more processing elements. The processing element herein may be an integrated circuit, for example: One or more ASICs, one or more DSPs, one or more FPGAs, or a combination of these integrated circuits. These integrated circuits may be integrated together to form a chip.

The units for implementing the steps in the foregoing methods may be integrated together and implemented in a form of a system-on-a-chip (SOC). The SOC chip is configured to implement the foregoing methods. At least one processing element and a storage element may be integrated into the chip, and the processing element invokes a program stored in the storage element to implement the foregoing method performed by the terminal device or the network device. Alternatively, at least one integrated circuit may be integrated into the chip, to implement the foregoing method performed by the terminal device or the network device. Alternatively, refer to the foregoing implementations, functions of some units may be implemented in a form of a program invoked by a processing element, and functions of some units may be implemented in a form of an integrated circuit.

In another implementation, an embodiment of this application provides a communication apparatus. The communication apparatus may include at least one processing element and an interface circuit. The at least one processing element is configured to perform any PDCCH monitoring method provided in the foregoing method embodiments. The processing element may perform a part or all of steps performed by the terminal device or the network device in a first manner, to be specific, by invoking a program stored in a storage element; or may perform a part or all of steps performed by the terminal device or the network device in a second manner, to be specific, by using a hardware integrated logic circuit in the processing element in combination with instructions; or may certainly perform, by combining the first manner and the second manner, a part or all of steps performed by the terminal device or the network device. It may be understood that the interface circuit may be a transceiver or an input/output interface. Optionally, the communication apparatus may further include a memory, configured to store instructions executed by the foregoing processing element, or store input data required by the processing element to run instructions, or store data generated after the processing element runs instructions.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits. The storage element may be one memory, or may be a general term of a plurality of storage elements.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

A resource in embodiments of this application may also be referred to as a transmission resource, including one or more of a time domain resource, a frequency domain resource, and a code channel resource. The resource may be used to carry data or signaling in an uplink communication process or a downlink communication process.

It should be understood that the term "and/or" in this specification describes only an association relationship between associated objects and represents that three relationships may exist. For example, A and/or B may represent the following three cases: Only A exists, both A and B exist, and only B exists.

It should be understood that, in embodiments of the present application, "B corresponding to A" indicates that B is associated with A, and B can be determined based on A. However, it should be further understood that determining B based on A does not mean that B is determined based only on A. B may alternatively be determined based on A and/or other information.

"A plurality of" in embodiments of this application refers to two or more than two.

Descriptions such as "first" and "second" in embodiments of this application are merely used for indicating and distinguishing between described objects, do not show a sequence, do not indicate a specific limitation on a quantity of described objects in embodiments of this application, and cannot constitute any limitation on embodiments of this application.

In embodiments of this application, unless otherwise specified, "transmission" (transmit/transmission) refers to bidirectional transmission, and includes a sending action and/or a receiving action. Specifically, "transmission" in embodiments of this application includes data sending, data receiving, or data sending and receiving. In other words, data transmission herein includes uplink data transmission and/or downlink data transmission. The data may include information and/or a signal. Uplink data transmission is uplink information and/or uplink signal transmission, and downlink data transmission is downlink information and/or downlink signal transmission.

It may be understood that in the embodiments of this application, the terminal device and/or the network device may perform some or all steps in the embodiments of this application. These steps or operations are merely examples. In the embodiments of this application, other operations or variations of various operations may be further performed. In addition, the steps may be performed in a sequence different from a sequence presented in embodiments of this application, and not all the operations in embodiments of this application may be necessarily performed.

What is claimed is:

1. A physical downlink control channel (PDCCH) monitoring method by a terminal device, the method comprising:

determining that a first monitoring capability of the terminal device is used to monitor physical downlink control channels of a cell set comprising at least two cells of the terminal device, wherein each cell in the cell set has a same span pattern and a same subcarrier spacing, wherein the span pattern is represented as (X, Y), wherein X represents a minimum symbol spacing between start symbols of two spans, and wherein Y represents a maximum quantity of consecutive symbols comprised in the span;

determining N non-overlapping time units of the cell set in one slot, wherein a start location of each of the N non-overlapping time units is based on a span of a cell in the cell set, wherein N is a positive integer, and wherein the time unit is X symbols; and allocating the first monitoring capability between the cells in the cell set in each of the N non-overlapping X symbols, to separately monitor PDCCHs of cells in the cell set, wherein the allocating the first monitoring capability between the cells in the cell set meets the following condition in each of the N non-overlapping X symbols:

a sum of maximum monitoring times allocated to cells in the cell set is less than or equal to the maximum monitoring times allocated to the first cell set; and a sum of the maximum quantity of control channel elements (CCEs) allocated to the cells in the cell set is less than or equal to the maximum quantity of CCEs allocated to the first cell set.

2. The method according to claim 1, wherein the allocating of the first monitoring capability in the cell set in each of the N non-overlapping X symbols comprises:

allocating, in response to symbols being occupied by a first span of a first cell partially or completely overlap with a first X symbols, a part or all of the first monitoring capability to the first cell based on a quantity of all symbols occupied by a span of the first cell, wherein the first cell is a cell in the cell set, and wherein the first X symbols is one of the N non-overlapping X symbols.

3. The method according to claim 1, wherein the allocating of the first monitoring capability in the cell set in each of the N non-overlapping X symbols comprises:

allocating, in response to symbols being occupied by a span of a second cell partially or completely overlap with a second X symbols, a part or all of the first monitoring capability to the second cell based on a proportion of a quantity of symbols in an overlapping part in a quantity of symbols occupied by the span of the second cell, wherein the second cell is a cell in the cell set, and wherein the second X symbols is one of the N non-overlapping X symbols.

4. The method according to claim 1, wherein each span of each cell in the cell set is located in one of the N non-overlapping X symbols.

5. The method according to claim 1, wherein the first monitoring capability of the terminal device is determined based on a maximum quantity of cells supported by the terminal device to monitor a physical downlink control channel and a monitoring capability corresponding to a span pattern corresponding to the first cell set.

6. A communication apparatus, comprising:

a memory storing instructions; and at least one processor in communication with the memory, the at least one processor configured to execute the instructions, wherein upon execution of the instructions, the at least one processor performs a physical downlink control channel (PDCCH) monitoring method, the method comprising the following:

determining that a first monitoring capability of the terminal device is used to monitor physical downlink control channels of a cell set comprising at least two cells of the terminal device, wherein each cell in the cell set has a same span pattern and a same subcarrier spacing, wherein the span pattern is represented as (X, Y), wherein X represents a minimum symbol spacing between start symbols of two spans, and wherein Y represents a maximum quantity of consecutive symbols comprised in the span;

determining N non-overlapping time units of the cell set in one slot, wherein a start location of each of the N non-overlapping time units is based on a span of a cell in the cell set, wherein N is a positive integer, and wherein the time unit is X symbols; and allocating the first monitoring capability between the cells in the cell set in each of the N non-overlapping X symbols, to separately monitor PDCCHs of cells in the cell set, wherein the allocating the first monitoring capability between the cells in the cell set meets the following condition in each of the N non-overlapping X symbols:

a sum of maximum monitoring times allocated to cells in the cell set is less than or equal to the maximum monitoring times allocated to the first cell set; and a sum of the maximum quantity of control channel elements (CCEs) allocated to the cells in the cell set is less than or equal to the maximum quantity of CCEs allocated to the first cell set.

7. The apparatus according to claim 6, wherein the allocating of the first monitoring capability in the cell set in each of the N non-overlapping X symbols comprises:

allocating, in response to symbols being occupied by a first span of a first cell partially or completely overlap with a first X symbols, a part or all of the first monitoring capability to the first cell based on a quantity of all symbols occupied by a span of the first cell, wherein the first cell is a cell in the cell set, and wherein the first X symbols is one of the N non-overlapping X symbols.

8. The apparatus according to claim 6, wherein the allocating of the first monitoring capability in the cell set in each of the N non-overlapping X symbols comprises:

allocating, in response to symbols being occupied by a span of a second cell partially or completely overlap with the second X symbols, a part or all of the first monitoring capability to the second cell based on a proportion of a quantity of symbols in an overlapping part in a quantity of symbols occupied by the span of the second cell, wherein the second cell is a cell in the cell set, and wherein the second X symbols is one of the N non-overlapping X symbols.

9. The apparatus according to claim 6, wherein each span of each cell in the cell set is located in one of the N non-overlapping X symbols.

10. The apparatus according to claim 6, wherein the first monitoring capability of the terminal device is determined based on a maximum quantity of cells supported by the terminal device to monitor a physical downlink control channel and a monitoring capability corresponding to a span pattern corresponding to the first cell set.

11. A non-transitory computer-readable medium having stored thereon, a computer program comprising at least one code section for distributing data, the at least one code section being executable by a terminal device for causing the terminal device to perform a physical downlink control channel (PDCCH) monitoring method, the method comprising the following:

determining that a first monitoring capability of the terminal device is used to monitor physical downlink control channels of a cell set comprising at least two cells of the terminal device, wherein each cell in the cell set has a same span pattern and a same subcarrier spacing, wherein the span pattern is represented as (X, Y), wherein X represents a minimum symbol spacing between start symbols of two spans, and wherein Y represents a maximum quantity of consecutive symbols comprised in the span;

determining N non-overlapping time units of the cell set in one slot, wherein a start location of each of the N non-overlapping time units is based on a span of a cell in the cell set, wherein N is a positive integer, and wherein the time unit is X symbols; and allocating the first monitoring capability between the cells in the cell set in each of the N non-overlapping X symbols, to separately monitor PDCCHs of cells in the cell set, wherein the allocating the first monitoring capability between the cells in the cell set meets the following condition in each of the N non-overlapping X symbols:

a sum of maximum monitoring times allocated to cells in the cell set is less than or equal to the maximum monitoring times allocated to the first cell set; and a sum of the maximum quantity of control channel elements (CCEs) allocated to the cells in the cell set is less than or equal to the maximum quantity of CCEs allocated to the first cell set.

12. The non-transitory computer-readable medium according to claim 11, wherein the allocating of the first monitoring capability in the cell set in each of the N non-overlapping X symbols comprises:

allocating, in response to symbols being occupied by a first span of a first cell partially or completely overlap with a first X symbols, a part or all of the first monitoring capability to the first cell based on a quantity of all symbols occupied by a span of the first cell, wherein the first cell is a cell in the cell set, and wherein the first X symbols is one of the N non-overlapping X symbols.

13. The non-transitory computer-readable medium according to claim 11, wherein the allocating of the first monitoring capability in the cell set in each of the N non-overlapping X symbols comprises:

allocating, in response to symbols being occupied by a span of a second cell partially or completely overlap with a second X symbols, a part or all of the first monitoring capability to the second cell based on a proportion of a quantity of symbols in an overlapping part in a quantity of symbols occupied by the span of the second cell, wherein the second cell is a cell in the cell set, and wherein the second X symbols is one of the N non-overlapping X symbols.

14. The non-transitory computer-readable medium according to claim 11, wherein each span of each cell in the cell set is located in one of the N non-overlapping X symbols.

15. The non-transitory computer-readable medium according to claim 11, wherein the first monitoring capability of the terminal device is determined based on a maximum quantity of cells supported by the terminal device to monitor a physical downlink control channel and a monitoring capability corresponding to a span pattern corresponding to the first cell set.

* * * * *